US012229835B2

(12) United States Patent
Sanchez

(10) Patent No.: US 12,229,835 B2
(45) Date of Patent: *Feb. 18, 2025

(54) CLOUD-BASED VEHICULAR TELEMATICS SYSTEMS AND METHODS FOR GENERATING HYBRID EPOCH DRIVER PREDICTIONS

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,353

(22) Filed: Sep. 28, 2023

(65) Prior Publication Data

US 2024/0020770 A1 Jan. 18, 2024

Related U.S. Application Data

(63) Continuation of application No. 17/060,894, filed on Oct. 1, 2020, now Pat. No. 11,900,466.

(Continued)

(51) Int. Cl.
*G06Q 40/08* (2012.01)
*B60W 40/09* (2012.01)
(Continued)

(52) U.S. Cl.
CPC .............. *G06Q 40/08* (2013.01); *B60W 40/09* (2013.01); *G01C 21/3484* (2013.01);
(Continued)

(58) Field of Classification Search
CPC ........ G07C 5/0841; G07C 5/008; G06N 3/02; G06Q 30/0207
See application file for complete search history.

(56) References Cited

U.S. PATENT DOCUMENTS 7,769,499 B2 8/2010 McQuade et al.
9,141,582 B1 9/2015 Brinkmann et al.
(Continued)

OTHER PUBLICATIONS

Junior, Jair Ferreira et al., " Driver Behavior profiling: An investigation with different smart phone sensors and machine learning", https:/doi.org/10137/journal.prone.0174959, Apr. 10, 2017, pp. 1-16. 2017.

(Continued)

*Primary Examiner* — Sizo B Vilakazi
(74) *Attorney, Agent, or Firm* — BRYAN CAVE LEIGHTON PAISNER LLP

(57) ABSTRACT

Method and system for generating a hybrid epoch score for a user. In some examples, a computer-implemented method includes: receiving, from at least one of a mobile device associated with the user and a server, prior telematics data indicative of the operation of a vehicle by the user during one or more prior trips in a prior epoch; receiving, from the mobile device, recent telematics data indicative of the operation of the vehicle by the user during one or more recent trips in a current epoch; generating a prior epoch score based at least in part upon the prior telematics data; generating a partial current epoch score based at least in part upon the recent telematics data; and generating a hybrid current epoch score based at least in part upon the prior epoch score and the partial current epoch score.

21 Claims, 9 Drawing Sheets

Related U.S. Application Data

(60) Provisional application No. 62/909,508, filed on Oct. 2, 2019.

(51) Int. Cl.

| | | |
|---|---|---|
| *G01C 21/34* | (2006.01) | |
| *G06N 3/02* | (2006.01) | |
| *G06N 3/08* | (2023.01) | |
| *G06Q 30/0207* | (2023.01) | |
| *G07C 5/00* | (2006.01) | |
| *G07C 5/08* | (2006.01) | |

(52) U.S. Cl.
CPC .......... *G01C 21/3492* (2013.01); *G06N 3/02* (2013.01); *G06N 3/08* (2013.01); *G06Q 30/0207* (2013.01); *G06Q 30/0224* (2013.01); *G07C 5/008* (2013.01); *G07C 5/08* (2013.01); *G07C 5/0841* (2013.01); *B60W 2556/10* (2020.02); *B60W 2556/55* (2020.02)

(56) References Cited

U.S. PATENT DOCUMENTS

| | | | |
|---|---|---|---|
| 9,315,195 | B2 | 4/2016 | Armitage et al. |
| 9,615,213 | B2 | 4/2017 | Tibbitts et al. |
| 9,688,283 | B2 | 6/2017 | Armitage et al. |
| 9,772,252 | B2 | 9/2017 | Williams |
| 9,805,601 | B1* | 10/2017 | Fields .................. G08G 1/0129 |
| 9,881,429 | B2 | 1/2018 | Davidson |
| 9,996,878 | B1* | 6/2018 | Fox ........................ G06Q 40/04 |
| 10,013,883 | B2 | 7/2018 | Farnham et al. |
| 10,026,243 | B1 | 7/2018 | Hsu-Hoffman et al. |
| 10,150,411 | B2 | 12/2018 | Armitage et al. |
| 10,304,338 | B1 | 5/2019 | Lau et al. |
| 10,322,728 | B1 | 6/2019 | Porikli et al. |
| 10,360,576 | B1 | 7/2019 | Hsu-Hoffman |
| 10,373,523 | B1 | 8/2019 | Fields et al. |
| 10,392,022 | B1 | 8/2019 | Rau |
| 10,403,057 | B1 | 9/2019 | Fawcett et al. |
| 10,414,408 | B1 | 9/2019 | Fields et al. |
| 10,430,883 | B1 | 10/2019 | Bischoff et al. |
| 10,445,758 | B1 | 10/2019 | Bryer et al. |
| 10,672,249 | B1 | 6/2020 | Balakrishnan et al. |
| 10,810,504 | B1 | 10/2020 | Fields et al. |
| 10,830,605 | B1* | 11/2020 | Chintakindi ....... G01C 21/3484 |
| 10,878,328 | B2 | 12/2020 | Mathur et al. |
| 10,885,539 | B1 | 1/2021 | Purgatorio et al. |
| 10,997,669 | B1 | 5/2021 | Kraft et al. |
| 11,012,526 | B1 | 5/2021 | Iynoolkhan et al. |
| 11,068,985 | B1 | 7/2021 | Bischoff et al. |
| 2007/0239322 | A1 | 10/2007 | McQuade et al. |
| 2008/0255722 | A1 | 10/2008 | McClellan et al. |
| 2008/0262670 | A1 | 10/2008 | McClellan et al. |
| 2008/0319602 | A1 | 12/2008 | McClellan et al. |
| 2010/0030586 | A1 | 2/2010 | Taylor et al. |
| 2011/0090075 | A1 | 4/2011 | Armitage et al. |
| 2012/0239462 | A1 | 9/2012 | Pursell et al. |
| 2012/0303392 | A1 | 11/2012 | Depura et al. |
| 2012/0330596 | A1 | 12/2012 | Kouznetsov |
| 2013/0046559 | A1* | 2/2013 | Coleman ................ G06Q 10/10 705/4 |
| 2014/0012634 | A1 | 1/2014 | Pearlman et al. |
| 2014/0052672 | A1 | 2/2014 | Wagner et al. |
| 2014/0095305 | A1 | 4/2014 | Armitage et al. |
| 2014/0099607 | A1 | 4/2014 | Armitage et al. |
| 2014/0167946 | A1 | 6/2014 | Armitage et al. |
| 2014/0278574 | A1 | 9/2014 | Barber |
| 2014/0322676 | A1 | 10/2014 | Raman |
| 2014/0372017 | A1 | 12/2014 | Armitage |
| 2015/0039175 | A1 | 2/2015 | Martin et al. |
| 2015/0112546 | A1 | 4/2015 | Ochsendorf et al. |
| 2017/0057518 | A1 | 3/2017 | Finegold et al. |
| 2017/0291611 | A1 | 10/2017 | Innes et al. |
| 2017/0349182 | A1 | 12/2017 | Cordova et al. |
| 2018/0107932 | A1 | 4/2018 | Pandurangarao |
| 2018/0174484 | A1 | 6/2018 | Bradley et al. |
| 2018/0345981 | A1 | 12/2018 | Ferguson et al. |
| 2018/0373855 | A1 | 12/2018 | Chowdhury et al. |
| 2019/0100216 | A1 | 4/2019 | Volos et al. |
| 2019/0102689 | A1 | 4/2019 | Lassoued et al. |
| 2019/0102840 | A1* | 4/2019 | Perl ........................ G06Q 40/08 |
| 2019/0266029 | A1 | 8/2019 | Sathyanarayana et al. |
| 2019/0287180 | A1* | 9/2019 | Vartanian ............... G07C 5/008 |
| 2019/0367037 | A1 | 12/2019 | Krishnamurthy et al. |
| 2019/0370687 | A1 | 12/2019 | Pezzillo et al. |
| 2019/0391587 | A1 | 12/2019 | Uvarov et al. |
| 2020/0031371 | A1 | 1/2020 | Soliman |
| 2020/0039525 | A1 | 2/2020 | Hu et al. |
| 2020/0079387 | A1 | 3/2020 | Krishna et al. |
| 2020/0175786 | A1* | 6/2020 | Bongers .................. G01S 19/52 |
| 2020/0257310 | A1 | 8/2020 | Du et al. |
| 2021/0272207 | A1 | 9/2021 | Fields et al. |
| 2021/0295443 | A1 | 9/2021 | Webster |

OTHER PUBLICATIONS

Zhang, XingZhou et al., "OpenEI: An Open Framework for Edge Intelligence", Department of Computer Science, Wayne State University, Detroit, MI, USA, Jun. 5, 2019, p. 1-12. 2019.

Satyamarayanan, Mahdev, "Edge Computing", Carnegie Mellon University, IEEE computer society, Oct. 2017, p. 1-3. 2017.

Y. Zhao, W. Wang, Y. Li, C_ Colman Meixner, M. Tornatore and J. Zhang, "Edge Computing and Networking: A Survey on Infrastructures and Applications, " in IEEE Access, vol. 7, pp. 101213-101230. 2019.

Chakravarty, T., et al., "MobiDriveScore—A system for mobile sensor based driving analysis:modcel for improving one's driving," 2013 Seventh International Conference on Sensing Technology (ICST), 2013, pp. 338-344. 2013.

G. Kar, B. Asiroglu, and F.S. Bir, "Scotto: Real-Time Driver Behavior Scoring Using In-Vehicle Data," 2019 IEEE 89th Vehicular Technology Conference (VTC2019-Spring), Kuala Lumpur, Malaysia, 2019, pp. 1-5. 2019.

* cited by examiner

CLOUD-BASED VEHICULAR TELEMATICS SYSTEMS AND METHODS FOR GENERATING HYBRID EPOCH DRIVER PREDICTIONS

CROSS REFERENCE TO RELATED APPLICATIONS

This application is a continuation of U.S. patent application Ser. No. 17/060,894, filed Oct. 1, 2020, which claims priority to U.S. Patent Application No. 62/909,508 filed Oct. 2, 2019, which is incorporated by reference herein for all purposes.

The following four applications, including this one, are being filed concurrently and the other three are hereby incorporated by reference in their entirety for all purposes:
1. U.S. patent application Ser. No. 17/060,894 titled "Cloud-Based Vehicular Telematics Systems and Methods for Generating Hybrid Epoch Driver Predictions";
2. U.S. patent application Ser. No. 17/060,902 titled "Cloud-Based Vehicular Telematics Systems and Methods for Generating Hybrid Epoch Driver Predictions Using Edge-Computing";
3. U.S. patent application Ser. No. 17/060,943 titled "Cloud-Based Vehicular Telematics Systems and Methods for Generating Hybrid Epoch Driver Predictions and Driver Feedback"; and
4. U.S. patent application Ser. No. 17/060,958 titled "Cloud-Based Vehicular Telematics Systems and Methods for Generating Hybrid Epoch Driver Predictions and Hazard Alerts".

FIELD OF THE DISCLOSURE

Some embodiments of the present disclosure are directed to cloud-based vehicular telematics systems and methods. More particularly, certain embodiments of the present disclosure provide methods and systems for cloud-based vehicular telematics systems and methods for generating hybrid epoch driver predictions. Merely by way of example, the present disclosure has been applied to telematics data, but it would be recognized that the present disclosure has much broader range of applicability.

BACKGROUND OF THE DISCLOSURE

Telematics information regarding operation of passenger vehicles may generally be collected for trips. The collected telematics data may be used in variable vehicular insurance pricing schemes, including pay-per-mile or pay-per-use, where a vehicle's trips, miles, or otherwise distance traveled, at some future time period may be computed based on the telematics data. An invoice, such as an insurance invoice, may then be prepared for a given vehicle or user based on the vehicle trip(s). A problem arises, however, with respect to the variability and/or uncertainty of such pay-per-mile or pay-per-use schemes because end-users are unable to determine the value of future invoices or other driver metrics based on current data. This can be especially true when telematics data are collected at high volume or high fidelity rates that can include the generation and collection of large numbers of records, such as tens of thousands of telematics records. With modern data collection techniques, such high volume and/or high fidelity telematics records can be generated even for short trips. For at least the foregoing reasons, there is a need for cloud-based vehicular telematics systems and methods for generating hybrid epoch driver predictions.

BRIEF SUMMARY OF THE DISCLOSURE

Some embodiments of the present disclosure are directed to cloud-based vehicular telematics systems and methods. More particularly, certain embodiments of the present disclosure provide methods and systems for cloud-based vehicular telematics systems and methods for generating hybrid epoch driver predictions. Merely by way of example, the present disclosure has been applied to telematics data, but it would be recognized that the present disclosure has much broader range of applicability.

According to various embodiments, a computer-implemented method for generating a hybrid epoch score for a user includes: receiving, from a mobile device associated with the user and/or a server, prior telematics data indicative of the operation of a vehicle by the user during one or more prior trips in a prior epoch; receiving, from the mobile device, recent telematics data indicative of the operation of the vehicle by the user during one or more recent trips in a current epoch; generating a prior epoch score based at least in part upon the prior telematics data; generating a partial current epoch score based at least in part upon the recent telematics data; and generating a hybrid current epoch score based at least in part upon the prior epoch score and the partial current epoch score.

According to various embodiments, a system for generating a hybrid epoch score for a user includes: a data receiving module configured to: receive, from a mobile device associated with the user and/or a server, prior telematics data indicative of the operation of a vehicle by the user during one or more prior trips in a prior epoch; and receive, from the mobile device, recent telematics data indicative of the operation of the vehicle by the user during one or more recent trips in a current epoch; and an epoch score generating module configured to: generate a prior epoch score based at least in part upon the prior telematics data; generate a partial current epoch score based at least in part upon the recent telematics data; and generate a hybrid current epoch score based at least in part upon the prior epoch score and the partial current epoch score.

According to various embodiments, a non-transitory computer-readable medium with instructions stored thereon, that upon execution by a processor, causes the processor to perform: receiving, from a mobile device associated with the user and/or a server, prior telematics data indicative of the operation of a vehicle by the user during one or more prior trips in a prior epoch; receiving, from the mobile device, recent telematics data indicative of the operation of the vehicle by the user during one or more recent trips in a current epoch; generating a prior epoch score based at least in part upon the prior telematics data; generating a partial current epoch score based at least in part upon the recent telematics data; and generating a hybrid current epoch score based at least in part upon the prior epoch score and the partial current epoch score.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Figure 1A:
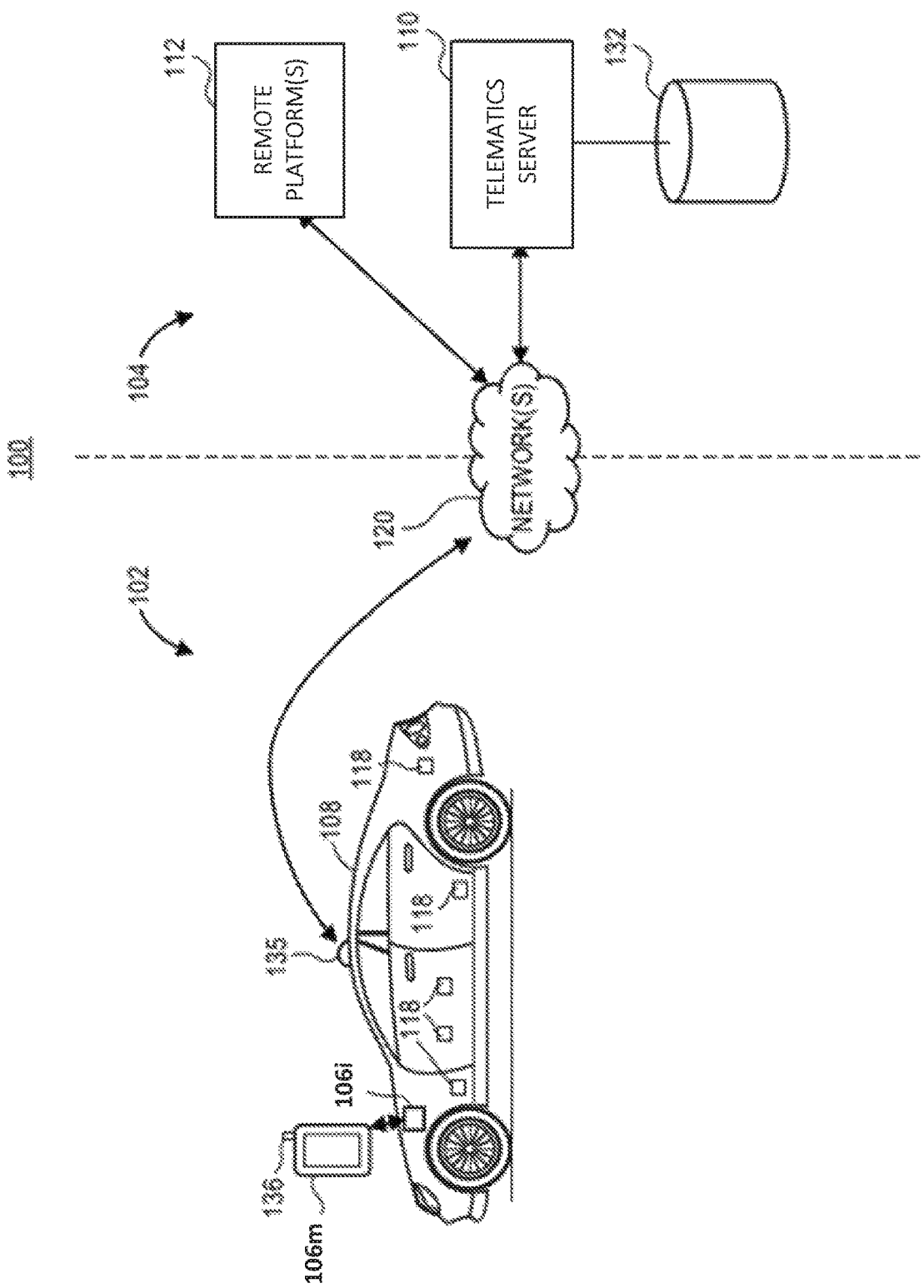
FIG. 1A is a simplified diagram showing a telematics cloud platform configured to receive vehicular telematics data from a telematics device onboard a vehicle, according to various embodiments of the present disclosure.

Some embodiments of the present disclosure are directed to cloud-based vehicular telematics systems and methods. More particularly, certain embodiments of the present disclosure provide methods and systems for cloud-based vehicular telematics systems and methods for generating hybrid epoch driver predictions. Merely by way of example, the present disclosure has been applied to telematics data, but it would be recognized that the present disclosure has much broader range of applicability.

In various embodiments, the present disclosure provides solutions to the high volume and/or high fidelity data rates typically involved with the generation and/or collection of vehicular telemetry data. In various examples, the present disclosure provides a variable insurance pricing system where end-users, such as vehicle drivers, may, such as on a continuous basis, and upon the generation of continued vehicular telematics data, receive an expected or predicted, future rate, and/or other prediction analytics, for a next cycle (e.g., a next billing cycle, such as a next month) in real-time, near real-time, or following the completion of one or more trips. Accordingly, in various embodiments disclosed herein, cloud-based vehicular telematics systems and methods are disclosed for generating hybrid epoch driver predictions.

In various embodiments, the vehicular telematics systems and methods may include a telematics mobile application configured to execute on a telematics device. The telematics mobile application may be configured to collect telematics data from one or more sensors during one or more trips. In some embodiments, the sensors may be part of the telematics device itself. In certain embodiments, the sensors may be part of a vehicle associated with the one or more trips, where the sensors transmit telematics data wirelessly (or wired) to the telematics device. In some examples, the telematics mobile application may render or generate a guided user interface (GUI) on a display of the telematics device. The GUI may include one or more screens, including a GUI control screen and/or controls, to allow for manipulation of the telematics mobile application by a user, such as by a driver of one or more vehicles associated with one or more trips.

In various embodiments, the vehicular telematics systems and methods may include a telematics server communicatively coupled, via a computer network, to the telematics mobile application. In some examples, the telematics server is configured to receive the telematics data from the mobile app and/or telematics device during the one or more trips. In various examples, the telematics server is configured to execute instructions causing the telematics server to implement one or more algorithms for generating epoch-based vehicle or driver predictions, including artificial intelligence vehicle or driver predictions as described herein. In various examples, the telematics server is configured to receive the telematics data from the telematics device. In some embodiments, the telematics data may be pushed to the telematics server from the telematics mobile application. In certain embodiments, the telematics data may be pulled by the telematics server, upon request by the telematics server, from the telematics mobile application.

In various embodiments, the telematics server is configured to generate a hybrid epoch driver score based at least in part upon a previous epoch driver score and a predicted driver epoch score. In some examples, the previous epoch score may be generated, by the telematics server, for a previous epoch (e.g., a previous month, week, etc.) from telematics data defined over one or more actual trips of the driver during the previous epoch. In some embodiments, the previous epoch score may relate to, or be used to generate, a rate or discount associated with a product or service (e.g., a rate or discount associated with an insurance policy of the driver). In various examples, the generating or a rate or discount is based on hybrid epoch score and/or information outside of the epoch, such as historical scores and/or data.

In various embodiments, the predicted epoch driver score may be generated, by the telematics server, for a current epoch (e.g., a current month, week, etc.). The predicted epoch driver score may be determined for a remaining (future) time period of the current epoch. In some examples, the predicted epoch driver score may be determined from (1) telematics data defined over one or more actual trips of the driver during the current epoch, and/or (2) telematics data predicted over one or more expected trips of the driver during the current epoch. In some examples, one or more expected trips (or total time value for such trips) is predicted for the driver for the remaining (future) current epoch time (e.g., the period of time for the current epoch that has not yet elapsed). The expected set of trips may be determined based at least in part upon the driver's past driving behavior as determined from past telematics data (e.g., from telematics data of one or more previous epochs). In various embodiments, quantity metric and/or quality metric of the user's past driving behavior may be generated using artificial intelligence or similar techniques, including statistical or regression analysis, machine-learning, natural networks, etc.

In various embodiments, the telematics server may generate the hybrid epoch driver score from portions of each of the previous epoch driver score and a predicted driver epoch score. In various examples, a blended, weighted, or otherwise hybrid score is generated by one or more algorithms using each of the previous epoch driver score and a predicted driver epoch score. In some examples, a proportionate predicted (future) epoch driver score is determined for the current epoch and is weighted or proportioned according to the remaining current epoch time. Similarly, a proportionate previous epoch driver score is determined for the previous epoch and is also weighted or proportioned according to the remaining current epoch time. A greater remaining current epoch time may cause a greater weighting or proportion of the previous epoch driver score to influence the hybrid epoch driver score. In contrast, a lesser remaining current epoch time may cause a lesser weighting or proportion of the previous epoch driver score to influence the hybrid epoch driver score.

In various examples, the telematics server may transmit to the telematics mobile application the hybrid epoch driver score. The transmission may be made in real-time or near real-time as the driver operates during, and/or completes, trips. The telematics mobile application may be configured to display the hybrid epoch driver score on a display via a GUI.

In various embodiments, the telematics server is configured to generate a previous epoch score based at least in part upon telematics data received by the telematics server from the telematics mobile application of a driver during a previous epoch (e.g., a previous month or period). The previous epoch score may be used as a starting factor, prediction value, or feature value, for a current epoch's (e.g., a current month's) predicted epoch driver score. In some examples, the starting prediction may be a feature input data value used to train or generate a machine learning model. Such prediction value may be updated after each trip an end-user (e.g., a vehicle driver) completes (or after each evening, if the drives infrequently). The prediction may incorporate computations, by the telematics server, that predict, the remainder of the epoch time period (e.g., month) based at least in part upon an assumption that an end-user would operate a vehicle at the same quantity/quality level as the user's past driving month. In some examples, the telematics server is configured to predict a driver's hybrid epoch driver score as the driver continues to drive, during the current epoch, based at least in part upon the quantity and/or quality the driver has driven in a previous epoch. In certain examples, the predicted epoch driver score (e.g., the score that factors the amount of driving the driver will perform for the rest of the month) is determined from the amount of proportional driving the driver performed in the prior epoch (e.g., in the prior month). In certain examples, the predicted epoch driver score may be determined from the actual trips, and related telematics data, of the current epoch (e.g., current month).

As an example, for a driver who drove 1000 minutes during a previous epoch (e.g., last month) and is half way through a current epoch (e.g., this month), the telematics server may presume that the driver would drive 500 more minutes in the current epoch (e.g., this month), and at the same quality that the driver drove during the previous (or current) epoch. The telematics server may then determine the simulated or hybrid epoch driver score for the current epoch (e.g., current month) based at least in part upon a weighting or blending of the actual/previous epoch driver score from the previous epoch (e.g., last month) with the predicted driver score of the current epoch, and further based at least in part upon the elapsed time of the current epoch. As an example, if a previous epoch included 1000 minutes, then where a driver has currently driven 500 minutes in the current epoch, 50% of the hybrid epoch driver score would be based at least in part upon the previous epoch actual score and 50% would be based at least in part upon the current epoch's simulated or predicted score.

In various embodiments, the systems and methods of the present disclosure provides a hybrid scoring approach that implements an iterative, epoch-based solution with numerous benefits, including that all trips that are higher-quality than average (e.g., no hard breaking, no speeding, no swerving, etc.), which would improve the hybrid epoch driver score (and vice versa). In addition, the hybrid epoch driver score, through time, does not have sudden spikes or drops, and, therefore, provides a smooth estimate to the end-user (driver). In addition, the hybrid epoch driver score becomes, the actual score at the end of the month as the hybrid epoch driver score becomes, and computationally replaces, the next epochs previous epoch score. Thus, implementation of the hybrid scoring solution allows for a predicted score to be reported to the user, which can also be the basis for a predicted or expected invoice to the user, allowing the cloud-based vehicular telematics to solve the aforementioned problems concerning lack of certainty and variability with ongoing reporting, pricing, and/or otherwise determining future driving metrics for the benefit of end-users (e.g., drivers).

In various examples, systems and methods of the present disclosure, via the implementation of the hybrid scoring solution, allows the telematics server to conserve memory and computational resources by avoiding the need for the telematics server to store and maintain previous scores, including across a potentially numerous and variable set of drivers or end-users. For the same reasons, this allows the telematics server to be a less robust, lighter weight, and/or less expensive, server or computing device. The vehicular telematics systems and methods described herein may allow for lightweight and accurate predictions on smaller and/or cheaper computational devices.

Advantages will become more apparent to those of ordinary skill in the art from the following descriptions of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

FIG. 1A represents an embodiment of telematics cloud platform 100 configured to receive vehicular telematics data from a telematics device onboard a vehicle 108, which includes infrastructure, including hardware devices, as described for various telematics system and methods embodiments herein. In particular, FIG. 1A illustrates a telematics server 110 configured to receive vehicular telematics data from one or more telematics devices (e.g., telematics device 106i and/or mobile device 106m) onboard a vehicle 108. As the term is used herein, "telematics data" may include vehicle specific data, sensor data, and/or vehicle environment related data that is generated, collected, monitored, measured, transmitted and/or otherwise manipulated by one or more telematics devices (e.g., telematics device 106i and/or mobile device 106m) or sensors associated with a vehicle. The telematics data may include various metrics that indicate the direction, speed, acceleration, braking, cornering, and/or motion of the vehicle in which the data are associated. Such data may be determined from sensors (e.g., sensors 118) on board the vehicle, a mobile telematics device traveling with the vehicle, GPS systems, or other such device described herein. The telematics data may include geographic position information defining a geographic location of a telematics device associated with a vehicle. Such data may include latitude and longitude coordinates, for example. The telematics data may further include time value of the geographic position information, defining a specific point in time the telematics device was at a given geographic location.

In certain examples, telematics cloud platform 100 may include both hardware and software components, where software components may execute on the hardware devices. Telematics cloud platform 100 may communicate via various data communication channels for communicating data (e.g., telematics data) between and among the various components.

As illustrated in FIG. 1A, telematics cloud platform 100 may be segmented into a set of front-end components 102 and a set of back-end components 104. The front-end components 102 may include a vehicle 108 which may be, in some examples, an automobile, a car, a truck, a tow truck, a snowplow, a boat, a motorcycle, a motorbike, a scooter, a recreational vehicle, or any other type of vehicle capable of roadway or water travel. Telematics device 106i may be permanently or removably installed onboard vehicle 108, and may generally be an on-board computing device capable of performing various functionalities relating to vehicular telemetric data generation, collection, and/or transmission. In some examples, telematics device 106i may be an integrated device of the vehicle. Further, telematics device 106i may be installed by the manufacturer of vehicle 108, or as an aftermarket modification or addition to vehicle 108. In FIG. 1A, although only one telematics device 106i is depicted, it should be understood that in some embodiments, a plurality of computers telematics devices 106i (which may be installed at one or more locations within vehicle 108) may be used.

Telematics cloud platform 100 may further include mobile device 106m that may be associated with vehicle 108, where mobile device 106m may be any type of electronic device such as a smartphone, notebook computer, tablet, "phablet," GPS (Global Positioning System) or GPS-enabled device, smart watch, smart glasses, smart bracelet, wearable electronic, PDA (personal digital assistants), pager, computing device configured for wireless communication, and/or the like. Mobile device 106m may implement one or more mobile operation systems, such as APPLE IOS or GOOGLE ANDROID. Mobile device 106m may be equipped or configured with a set of sensors, such as a location module (e.g., a GPS chip), an image sensor, an accelerometer, a clock, a gyroscope, a compass, a yaw rate sensor, a tilt sensor, and/or other sensors.

Mobile device 106m may belong to or be otherwise associated with a user (e.g., a driver of vehicle 108), where the user may be an owner of vehicle 108 or otherwise associated with vehicle 108. In some examples, mobile device 106m may be a mobile device of a user, where such mobile device performs any and/or all of a telematics device as described herein. In some examples, the user may rent vehicle 108 for a variable or allotted time period, or the individual may at least partially operate (or be a passenger of) vehicle 108 as part of a ride share. In some examples, the user may at least partially operate vehicle 108 (and may thus be an operator of the vehicle), or may be a passenger of vehicle 108 (e.g., if vehicle 108 is an autonomous vehicle). According to embodiments, a user may carry or otherwise have possession of mobile device 106m during operation of vehicle 108, regardless of whether the individual is the operator or passenger of vehicle 108.

In some embodiments, telematics device 106i may operate in conjunction with mobile device 106m to perform any or all of the functions described herein, including generating, collecting, and/or transmitting telematics data as described herein. In certain embodiments, telematics device 106i may perform any or all of the on-board vehicle functions described herein, in which case mobile device 106m may not be present or may not be connected to telematics device 106i. In still certain embodiments, mobile device 106m may perform any or all of the onboard functions described herein.

Telematics device 106i and/or mobile device 106m may communicatively interface with one or more on-board sensors 118 that are disposed on or within vehicle 108 and that may be utilized to monitor vehicle 108 and the environment in which vehicle 108 is operating. In particular, the one or more on-board sensors 118 may sense conditions associated with vehicle 108 and/or associated with the environment in which vehicle 108 is operating, and may generate telematics data indicative of the sensed conditions. In some examples, the telematics data may include a location and/or operation data indicative of operation of vehicle 108. In some configurations, at least some of the on-board sensors 118 may be fixedly disposed at various locations on vehicle 108. In certain examples, at least some of the on-board sensors 118 may be incorporated within or connected to telematics device 106i. In certain examples, at least some of the on-board sensors 118 may be included on or within mobile device 106m.

The on-board sensors 118 may communicate respective telematics data to telematics device 106i and/or to mobile device 106m, and the telematics data may be processed using telematics device 106i and/or mobile device 106m to determine when vehicle 108 is in operation as well as determine information regarding operation of vehicle 108. In some situations, the on-board sensors 118 may communicate respective telematics data indicative of the environment in which vehicle 108 is operating. In some examples, telematics device 106i and/or mobile device 106m may additionally be configured to obtain geographic location data and/or telematics data by communicating with sensors 118. In some embodiments, on-board computer may obtain geographic location data via communication with a vehicle-integrated global navigation satellite system (GNSS), GPS, etc. To provide additional examples, on-board computer may obtain one or more metrics related to the speed, direction, and/or motion of vehicle 108 via any number of suitable sensors (e.g., sensors 118), which can include speedometer sensors, braking sensors, airbag deployment sensors, crash detection sensors, accelerometers, etc.

According to embodiments, the sensors 118 may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors 118 (e.g., GPS, accelerometer, or tachometer units) may provide telematics data indicative of, in some examples, the vehicle's 108 location, speed, position acceleration, direction, responsiveness to controls, movement, etc.

Other sensors 118 may be directed to the interior or passenger compartment of vehicle 108, such as cameras, microphones, pressure sensors, weight sensors, thermometers, or similar sensors to monitor any passengers, operations of instruments included in vehicle 108, operational behaviors of vehicle 108, and/or conditions within vehicle 108. In some examples, on-board sensors 118 directed to the interior of vehicle 108 may provide telematics data indicative of, in some examples, in-cabin temperatures, in-cabin noise levels, data from seat sensors (e.g., indicative of whether or not an individual is using a seat, and thus the number of passengers being transported by vehicle 108), data from seat belt sensors, data regarding the operations of user controlled devices such as windshield wipers, defrosters, traction control, mirror adjustment, interactions with on-board user interfaces, etc. Additionally, the on-board sensors 118 may further detect and monitor the health of the occupant(s) of vehicle 108 (e.g., blood pressure, heart rate, blood sugar, temperature, etc.).

In various embodiments of telematics cloud platform 100, front-end components 102 may communicate collected telematics data to back-end components 104 (e.g., via a network(s) 120). In particular, at least one of telematics device 106i or mobile device 106m may communicate with back-end components 104 via the network(s) 120 to enable back-end components 104 to receive and/or store collected telematics data and information regarding usage of vehicle 108.

The network(s) 120 may include a proprietary network, a secure public internet, a virtual private network, and/or some other type of network, such as dedicated access lines, plain ordinary telephone lines, satellite links, cellular data networks, combinations of these and/or other types of networks. The network(s) 120 may utilize one or more radio frequency communication links to communicatively connect to vehicle 108, e.g., utilize wireless communication link(s) to communicatively connect with mobile device 106m and telematics device 106i. Where the network(s) 120 comprises the Internet or other data packet network, data communications may take place over the network(s) 120 via an Internet or other suitable data packet communication protocol. In certain examples, the network(s) 120 includes one or more wired communication links or networks.

Back-end components 104 include one or more servers or computing devices, which may be implemented as a server bank/server farm, or cloud computing platform, and is interchangeably referred to herein as telematics server 110. Telematics server 110 may include one or more computer processors adapted and configured to execute various software applications and components of telematics cloud platform 100, in addition to other software components, as described herein.

Telematics server 110 may further include or be communicatively connected to one or more data storage devices 132 (e.g., databases), which may be adapted to store telematics data related to the operation of vehicle 108, or GUI value data that is determined from telematics data, as described herein. In some examples, the one or more data storage devices 132 may be implemented as a data bank or a cloud data storage system, at least a portion of which may be locally accessed by telematics server 110 using a local access mechanism such as a function call or database access mechanism (e.g., SQL), and/or at least a portion of which may be remotely accessed by telematics server 110 using a remote access mechanism such as a communication protocol. Telematics server 110 may access data stored in the one or more data storage devices 132 when executing various functions and tasks associated with the present disclosure, including, in some examples, receiving telematics data from telematics device 106i and/or mobile device 106m, and/or transmitting GUI values to a telematics mobile app as described herein.

Back-end components 104 may further include one or more remote platform(s) 112, which may be any system, entity, repository, or the like, capable of obtaining and storing data, processing data, or returning values or data associated with vehicle operation as described herein. Although FIG. 1A depicts the set of remote platform(s) 112 as separate from the one or more data storage devices 132, it should be appreciated that the set of remote platform(s) 112 may be included as part of the one or more data storage devices 132. In some embodiments, the remote platform(s) 112 may store or process data indicative of vehicle operation regulations. In some examples, the third-party source 112 may store speed limit information, direction of travel information, lane information, map information, route information, and/or similar information. The remote platform(s) 112 may also maintain or obtain real-time data indicative of traffic signals for roadways (e.g., which traffic signals currently have red lights or green lights). In certain examples, the one or more data storage devices or entities 132 may store the data indicative of vehicle operation regulations.

To communicate with telematics server 110 and other portions of back-end components 104, front-end components 102 may include a communication component(s) 135, 136 that are configured to transmit information to and receive information from back-end components 104. The communication components 135, 136 may include one or more wireless transmitters or transceivers operating at any desired or suitable frequency or frequencies.

Wireless transmitters or transceivers may operate at different frequencies and/or by using different protocols, if desired. In an example, mobile device 106m may include a respective communication component 136 for sending or receiving information to and from telematics server 110 via the network(s) 120, such as over one or more radio frequency links or wireless communication channels which support a first communication protocol (e.g., GSM, CDMA, LTE, one or more IEEE 802.11 standards such as Wi-Fi, WiMAX, BLUETOOTH, etc.). In certain examples, telematics device 106i may operate in conjunction with an on-board transceiver or transmitter 135 that is disposed at vehicle 108 (which may, in some examples, be fixedly attached to vehicle 108) for sending or receiving information to and from telematics server 110 via the network(s) 120, such as over one or more radio frequency links or wireless communication channels which support the first communication protocol and/or a second communication protocol.

In some embodiments, telematics device 106i may operate in conjunction with mobile device 106m to utilize the communication component 136 of mobile device 106m to deliver telematics data to back-end components 104. Similarly, telematics device 106i may operate in conjunction with mobile device 106m to utilize the communication component 135 of vehicle 108 to deliver telematics data to back-end components 104. In some embodiments, the communication components 135, 136 and their respective links may be utilized by telematics device 106i and/or mobile device 106m to communicate with back-end components 104.

Accordingly, either one or both of mobile device 106m or telematics device 106i may communicate (e.g., send telematics data) via network(s) 120 over the link(s). Additionally, in some configurations, mobile device 106m and telematics device 106i may communicate with one another directly over a wireless or wired link. Telematics device 106i and/or mobile device 106m disposed at vehicle 108 may communicate via the network(s) 120 and the communication component(s) 135, 136 by using one or more suitable wireless communication protocols (e.g., GSM, CDMA, LTE, one or more IEEE 802.11 Standards such as Wi-Fi, WiMAX, BLUETOOTH, etc.).

Figure 1B:
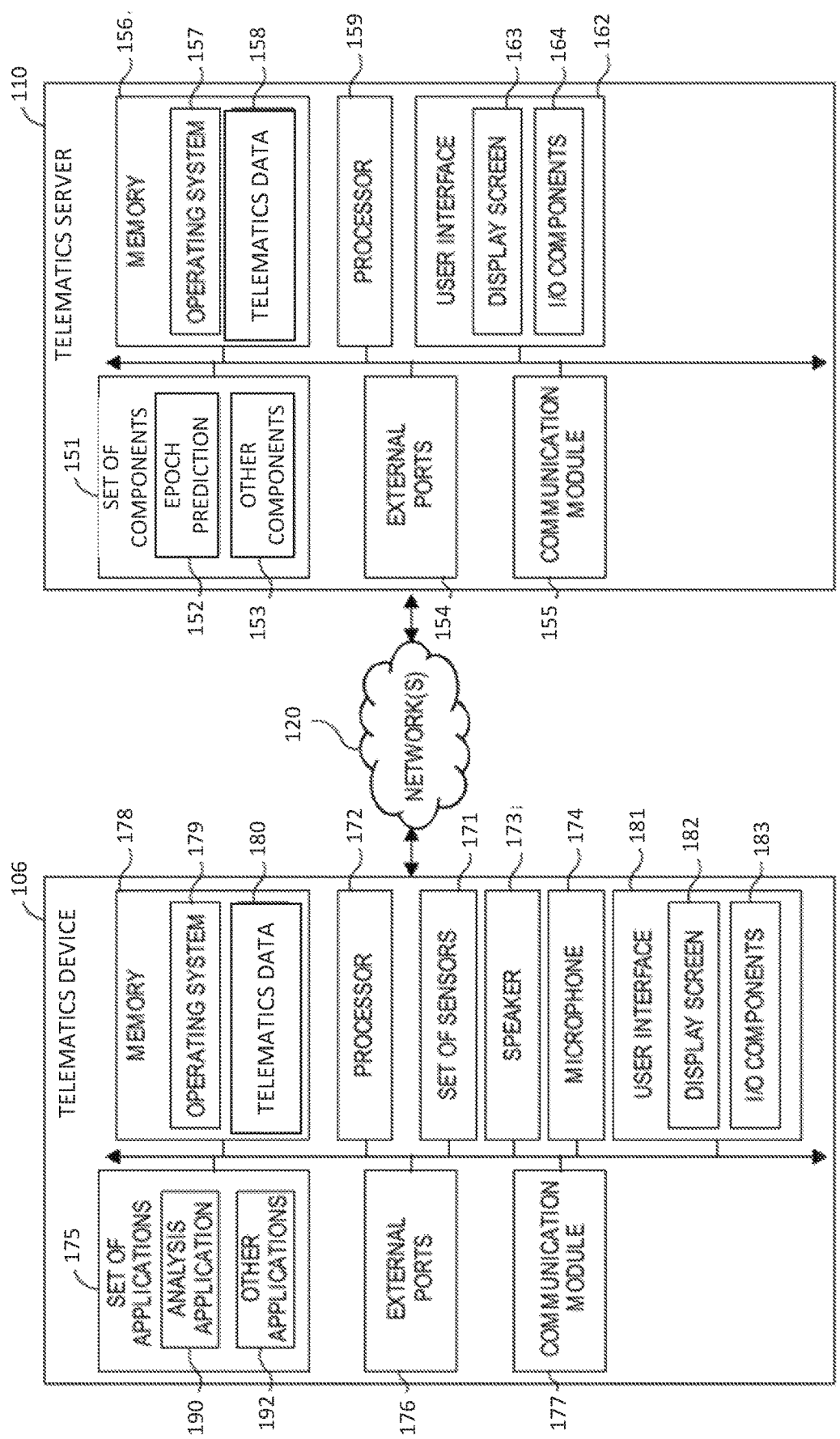
FIG. 1B is a simplified diagram showing a block diagram of a telematics cloud platform and a telematics device, according to various embodiments of the present disclosure.

FIG. 1B illustrates a block diagram of telematics server 110 and a telematics device 106 (e.g., telematics device 106i and/or mobile device 106m) of FIG. 1A in accordance with various embodiments disclosed herein. In particular, FIG. 1B illustrates a hardware diagram of an example telematics device 106 (such as telematics device 106i and/or mobile device 106m as discussed with respect to FIG. 1A) and an example telematics server 110 (e.g., telematics server 110 as discussed with respect to FIG. 1A), in which the systems and methods as discussed herein may be implemented.

As shown in FIG. 1B, telematics device 106 may include a processor 172 as well as a memory 178. Memory 178 may store an operating system 179 capable of facilitating the functionalities as discussed herein as well as a set of applications 175 (e.g., machine readable instructions). In some examples, one of the set of applications 175 may be an analysis application 190 configured to facilitate several of the functionalities as discussed herein. It should be appreciated that one or more other applications 192 are envisioned, such as an application for generating, collecting, monitoring, measuring, and/or transmitting telematics data via telematics device 106 as described herein.

Processor 172 may interface with the memory 178 to execute the operating system 179 and the set of applications 175. According to some embodiments, the memory 178 may also include telematics data 180 including data accessed or collected from a set of sensors (e.g., sensors 118) or directly via a telematics device (e.g., telematics device 106i and/or mobile device 106m). The memory 178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics device 106 may further include a communication module 177 configured to communicate data via one or more networks 120. According to some embodiments, the communication module 177 may include one or more transceivers (e.g., WWAN, WLAN, and/or WPAN transceivers) functioning in accordance with IEEE standards, 3GPP standards, or other standards, and configured to receive and transmit data via one or more external ports 176. In some examples, the communication module 177 may interface with another device, component, or sensors via the network(s) 120 to retrieve sensor data.

In some embodiments, telematics device 106 may include a set of sensors 171 such as, in some examples, a location module (e.g., a GPS chip), an image sensor, an accelerometer, a clock, a gyroscope, a compass, a yaw rate sensor, a tilt sensor, telematics sensors, and/or other sensors. Telematics device 106 may further include user interface 181 configured to present information to a user and/or receive inputs from the user. As shown in FIG. 1A, the user interface 181 may include a display screen 182 and I/O components 164 (e.g., ports, capacitive or resistive touch sensitive input panels, keys, buttons, lights, LEDs). According to some embodiments, the user may access telematics device 106 via the user interface 181 (e.g., a guided user interface (GUI)) to review information, make selections, and/or perform other functions. Additionally, telematics device 106 may include a speaker 173 configured to output audio data and a microphone 174 configured to detect audio.

In some embodiments, telematics device 106 may perform the functionalities as discussed herein as part of a "cloud" network (e.g., via network(s) 120 and telematics server 110) or may otherwise communicate with other hardware devices or software components within the cloud to send, retrieve, or otherwise analyze data. In some embodiments, telematics server 110 may operate as a Software-as-a-Service (SaaS) or Platform-as-a-Service (Paas), providing the functionality of telematics server 110 remotely to software apps and other components in accordance with the various embodiments described herein.

As illustrated in FIG. 1A and FIG. 1B, telematics device 106 may communicate and interface with telematics server 110 via the network(s) 120. Telematics server 110 may include a processor 159 as well as a memory 156. The memory 156 may store an operating system 157 capable of facilitating the functionalities as discussed herein as well as a set of components 151 (e.g., machine readable instructions). In some examples, one of the set of components 151 may include epoch prediction component 152 configured to facilitate several of the functionalities discussed herein. It should be appreciated that one or more other components 153 are envisioned.

The processor 159 may interface with the memory 156 to execute the operating system 157 and the set of components 151. According to some embodiments, the memory 156 may also include telematics data 158, such as telematics data received from telematics device 106, and/or other data, other data as described herein. The memory 456 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics server 110 may further include a communication module 155 configured to communicate data via the one or more networks 120. According to some embodiments, the communication module 155 may include one or more transceivers (e.g., WWAN, WLAN, and/or WPAN transceivers) functioning in accordance with IEEE standards, 3GPP standards, or other standards, and configured to receive and transmit data via one or more external ports 154. In some examples, the communication module 155 may receive, from telematics device 106, a set(s) of sensor data.

Telematics server 110 may further include user interface 162 configured to present information to a user and/or receive inputs from the user. As shown in FIG. 1A, the user interface 162 may include a display screen 163 and I/O components 164 (e.g., ports, capacitive or resistive touch sensitive input panels, keys, buttons, lights, LEDs). According to some embodiments, the user may access telematics server 110 via the user interface 162 to review information, make changes, input training data, and/or perform other functions.

In some embodiments, telematics server 110 may perform the functionalities as discussed herein as part of a "cloud" network or may otherwise communicate with other hardware or software components within the cloud to send, retrieve, or otherwise analyze data.

In general, a computer program product in accordance with any embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 172, 159 (e.g., working in connection with the respective operating systems 179, 157) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, JavaScript, CSS, XML). In some embodiments, the computer program product may be part of a cloud network of resources.

Figure 2:
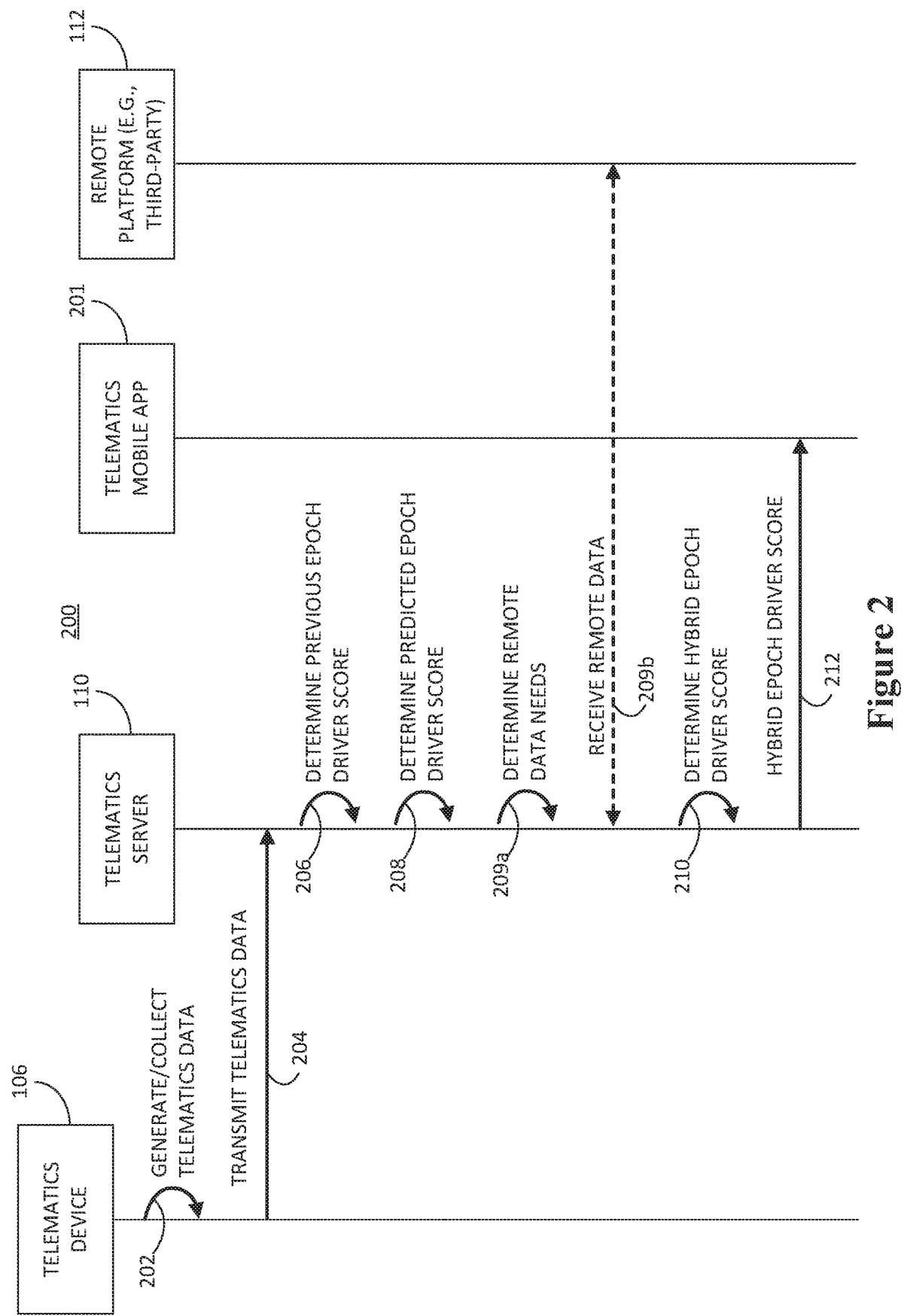
FIG. 2 is a simplified diagram showing a data transmission and implementation diagram of a cloud-based vehicular telematics system for generating hybrid epoch driver predictions, according to various embodiments of the present disclosure.

FIG. 2 illustrates a data transmission and implementation diagram of an example cloud-based vehicular telematics system 200 for generating hybrid epoch driver predictions in accordance with various embodiments herein. Cloud-based vehicular telematics system 200 may include all, or part, of the computing devices, features, and/or other functionality as described herein for FIG. 1A and FIG. 1B. Accordingly, the disclosure for FIG. 1A and FIG. 1B applies the same or similarly for FIG. 2. In particular, cloud-based vehicular telematics system 200 includes telematics device 106 (e.g., telematics device 106i and/or mobile 106m), telematics server 110, and remote platform 112, each as described herein with respect to FIG. 1A and FIG. 1B.

In the embodiment of FIG. 2, telematics device 106 generates and/or collects (202) telematics data associated with operation of a vehicle (e.g., vehicle 108) during one or more trips of the vehicle. Telematics device 106 (e.g., telematics device 106i and/or mobile device 106m) may collect the telematics data, e.g., via sensors 118, GPS systems, or other systems or components as described herein for FIG. 1A and FIG. 1B. In this way, vehicular telematics data, as described herein, may define a vehicular trip of a vehicle (e.g., vehicle 108). In various embodiments, a plurality of vehicular telematics defining a vehicular trip of a vehicle may define a telematics dataset having a certain data size (e.g., several gigabytes or megabytes of data). The data size is generally proportional to the number of telematics data records collected for the vehicle trip.

In some embodiments, the telematics data, as generated or collected by telematics device 106, may include thousands, and in some instances millions or more, records of data. In some examples, in certain embodiments the telematics data may comprise 15 Hertz (Hz) data, such as telematics data that is generated or collected 15 times per second. In such embodiments, a trip with a duration of 10 minutes would result in the generation and/or collection of 9,000 telematics data records.

A telematics data record, as the term is used herein, may refer to an instance of vehicle or vehicle environment data determined at a particular time. In some examples, in various embodiments herein, each telematics data record of a plurality of telematics data may include a geographic position of a telematics device (e.g., telematics device 106i and/or mobile device 106m) and a time value of the geographic position. In this way, telematics data are able to define a state of vehicle and/or telematics device at a given point in time. As recorded, a telematics data record may comprise a single row of data as may be represented in a data table, relational database, or other data structure. In some embodiments, the telematics data may be associated with a particular user. In some examples, the telematics data may be associated with a driver or passenger of the vehicle (e.g., vehicle 108).

With respect to the embodiment of FIG. 2, telematics device 106 transmits (204) the telematics data (e.g., via network(s) 120) to telematics server 110. Telematics server 110 receives (e.g., via its external ports and/or communication modules 155) and processes the telematics data. Processing telematics data may refer to, but is not limited to, generating hybrid epoch driver predictions as descried herein, or performing pre-processing and/or post-processing analysis, such as determining start times for trip, positions, times, or other data or information as described herein, from the received telematics data. In some embodiments, processing telematics data may attach metadata to the telematics data records, or GUI values, where such metadata include data generated, determined from, or otherwise resulting from the telematics data as received from telematics device 106.

In some embodiments, because of the large number of telematics data records generally received from telematics device 106, telematics server 110 may receive (e.g., via its external ports and/or communication modules 155) and process the telematics data using data efficient techniques. In some examples, telematics data, as received by telematics device 106, is processed by telematics server 110 via an asynchronous process. In such embodiments, telematics server 110 may comprise a plurality of software components, including consumer components and producer components. The consumer components are implemented to receive and/or store (e.g., in memory 156 or data storage devices 132) incoming telematics data. The producer components are implemented to process the telematics data, in some examples, by compressing the telematics data into GUI values, or performing post-processing analysis as described herein.

In some embodiments, the consumer components and the producer components may implement via multiple computational threads, in a multi-threaded environment of the telematics server 110. In a multi-threaded environment, consumer components and producer components may operate at the same time so as to increase the throughput and efficiency of the processing of the telematics data as described herein.

Certain embodiments for receiving and processing telematics data are contemplated herein, such that the telematics system and methods are not limited to consumer/producer embodiments. In some examples, a single software component may be implemented for receiving and processing all telematics data. In certain embodiments, telematics data could store telematics data in memory (e.g., in memory 156 or data storage devices 132), where a batch component of the telematics cloud form 110 could select certain amounts of telematics data to process at one time. In this way, such embodiments result in batch processing of received telematics data. In such embodiments, telematics server 110 may be configured to batch process the telematics data at specific time intervals (e.g., every minute, hour, day, etc.).

In still further embodiments, telematics data may be processed only when a request is received from a client device (e.g., mobile device of user) for the data. In some examples, a telematics mobile app executing on a mobile device, as described herein, may be configured to request data for a particular time period, which may cause the telematics server 110, e.g., via a client component, to process telematics data in real-time in order to respond to the request. It should be appreciated that portions of and/or combinations of any or all of the above embodiments may be used to process and receive telematics data as part of the telematics systems and methods as described herein.

As described with respect to FIG. 1B, telematics server 110 may include an epoch prediction application or component (e.g., epoch prediction component 152) configured to generate hybrid epoch driver predictions as described herein. Epoch prediction component 152 is a software application, component, object, or set of objects, e.g., of an object-oriented programming language, that implements predictive analytics with artificial intelligence, statistical analysis, or the like using the driver telematics data as input, such as feature input into a machine learning algorithm. The epoch prediction component 152 may receive telematics data (204) from telematics device 106 implementing telematics mobile app during (or after the completion of) one or more trips. In some embodiments, the telematics data may be pushed to the telematics server 110 from the telematics device 106 and/or a telematics app. In certain embodiments, the telematics data may be pulled by the telematics server, upon request by the telematics server, from the telematics device 106.

Epoch prediction component 152, as implemented on the telematics server 110, is configured to execute instructions causing the telematics server to implement one or more algorithms for generating real-time, near real-time, or trip-based driver epoch-based vehicle or driver predictions. Epoch prediction component 152, as implemented on the telematics server 110, may generate a previous epoch score (206) for a previous epoch (e.g., a previous month, week, etc.) from telematics data defined over one or more actual trips (e.g., of vehicle 108) of the driver during the previous epoch. As described herein, the previous epoch score may relate to, or be used to generate, a rate or discount associated with a product or service (e.g., a rate or discount associated with an insurance policy of the driver).

In addition, epoch prediction component 152, as implemented on the telematics server 110, may generate a predicted epoch driver score (208) for a current epoch (e.g., a current month, week, etc.). Epoch prediction component 152 determines the predicted for a remaining (future) time period of the current epoch. In various embodiments, epoch prediction component 152 determines the predicted epoch driver score from each of (1) telematics data (204) defined over one or more actual trips of the driver during the current epoch, and (2) and telematics data predicted, such as via machine learning, over one or more expected trips of the driver during the current epoch. Epoch prediction component 152 may predict one or more expected trips (or total time value for such trips) for the driver of vehicle 108 for the remaining (future) current epoch time (e.g., the period of time for the current epoch that has not yet elapsed). The expected set of trips may be determined based at least in part upon the driver's past driving behavior as determined from past telematics data (e.g., from telematics data of one or more previous epochs). In various embodiments, both quantity and/or quality metrics of the user's past driving behavior may be generated using artificial intelligence or similar techniques, including statistical or regression analysis, machine-learning, natural networks, etc.

The epoch prediction component 152 may include a machine learning model used to predict or generate predicted epoch driver scores. Such machine learning model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (e.g., the quality or quantity of driving of a driver for a specific epoch as determined from the telematics data of a current or previous epoch) in order to facilitate making predictions for subsequent data (e.g., to predict how a driver will drive during a remaining time period of a current or future epoch).

Machine learning model(s), such as those of epoch prediction component 152, may be created and trained based at least in part upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), in some examples, by determining and/or assigning weights or other metrics to the model across its various feature categories. Such rules, relationships, or otherwise models may then be provided subsequent inputs in order for the model, executing on the server, computing device, or otherwise processor(s), to predict, based at least in part upon the discovered rules, relationships, or model, an expected output.

In unsupervised machine learning, the server, computing device, or otherwise processor(s), may be needed to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In FIG. 2, epoch prediction component 152 may use a driver's telematics data (e.g., telematics data 204) as features to train the epoch prediction component 152's model against labels that may include driving scores, such as past driving scores that the user achieved for past epochs having the same or similar quantity and/or quality of telematics data a currently received. Quality of the telematics data may refer to the degree to which the driver demonstrated safe or acceptable driving behavior (or vice versa) as defined by the telematics data. In some examples, metrics such as hard breaking, speeding, swerving, and the like may be determined from the data. Quantity of the telematics data may refer to an amount of driving time as defined by the telematics data. The output of epoch prediction component 152 may be a predicted epoch driver score that defines an expected driver score for the driver at the end of the current epoch using any of the quality or quantity data as feature input values.

Telematics server 110 may generate the hybrid epoch driver score (210) from portions of each of the previous epoch driver score and a predicted driver epoch score. In various embodiments, telematics server 110 may generate hybrid epoch driver score (210) as a blended, weighted, or otherwise hybrid score using each of the previous epoch driver score (206) and a predicted driver epoch score (208). In some examples, a proportionate predicted (future) epoch driver score is determined for the current epoch and is weighted or proportioned according to the remaining current epoch time. Similarly, a proportionate previous epoch driver score is determined for the previous epoch and is also weighted or proportioned according to the remaining current epoch time. A greater remaining current epoch time may cause a greater weighting or proportion of the previous epoch driver score to influence the hybrid epoch driver score. In contrast, a lesser remaining current epoch time may cause a lesser weighting or proportion of the previous epoch driver score to influence the hybrid epoch driver score.

Hybrid epoch driver scores may be implemented by the telematics server 110 from portions of each of the previous epoch driver score and a predicted driver epoch score using various algorithms. In a first estimation algorithm, telematics server 110 determines a percentage of time (p) that has elapsed for a current epoch (e.g., a current month, a current billing period, etc.). In some examples, if a quarter of the current epoch has already elapsed (e.g., a quarter of a billing period has elapsed), then p would equal 0.25. In such embodiment, telematics server 110 determines an estimated minutes of driving for the remaining current epoch time. In particular, telematics server 110 multiplies (1−p) times the number of minutes driven by a driver in a previous epoch (e.g., in a previous month, billing cycle, etc.). If no previous epochs are available (because the driver is new), then telematics server 110 may assume a standard or starting number of minutes (which may be determined from other driver records). In some examples, a new driver may be presumed to have driven 45 hours in a previous epoch based at least in part upon similarly situated drivers. The telematics server 110 may then add the actual minutes driven by the driver in the current epoch. In some examples, if the telematics server 110 collected 1000 minutes for the driver in the previous epoch and the driver has driven 400 minutes in the current epoch period, then, if the percentage of time (p) that has elapsed for the current epoch period (p) is 0.25, then an estimated total minutes of driving for the current epoch is (1−0.25)*1000+400=1150 minutes. For the first estimation algorithm, this value is the predicted epoch driver score. The telematics server 110 may then determine the hybrid epoch driver score using the predicted epoch driver score, the estimated driving time, and the actual driving time. In particular, the hybrid epoch driver score may be determined as the weighted average of the previous epoch driver score and the predicted epoch driver score based at least in part upon the percentage of time (p) formulation. In some examples, if the predicted epoch driver score is 0.35 (e.g., based at least in part upon quality and quantity of driving) and the previous epoch driver score is 0.20, and a quarter of the month has passed (p=0.25), then telematics server 110 determines the hybrid epoch driver score as p*predicted_epoch_driver_score+(1−p)*predicted_epoch_driver_score=0.25*0.35+0.75*0.20=0.2375. The hybrid epoch driver score may be updated in real-time, near real-time, after completion of a trip, or at some other time period (such as once a day). In this way, the next previous epoch driver score will equal, or become equal to, the predicted epoch driver score, as the current epoch ends and a new current epoch begins. In this way, the driver's hybrid epoch driver score is affected by two main activities, as determined via the driver's telematics data, namely, the quantity and quality of the driver's driving habits.

As a further example, a sub-score algorithm may be used to generate a hybrid epoch driver score. In sub-score algorithm, a set value of trip minutes (e.g., 900 minutes) is determined or set for a driver for the current epoch by the telematics server 110. Each of the minutes of the set value of trip minutes is assigned a sub-score level based at least in part upon the prior epoch's sub-score levels. In the sub-score algorithm, at the beginning of each epoch time period, telematics server 110 sets a driver's current sub-scores equal to his or her prior epoch's sub-scores. If the driver is new (e.g., a first epoch for the driver), then the driver's current sub-scores is determined based at least in part upon sub-scores of other drivers, such as by using an average, median, etc. of other similarly situated or otherwise drivers. In the sub-score algorithm, once the driver takes a first trip, the driver's sub-scores are updated based at least in part upon the duration and quality of the trip. In some examples, if the first trip was 30 minutes, then 870 parts (reflective of minutes) of the sub-score would be based at least in part upon a previous epoch's sub-scores (e.g., this is the previous epoch driver score) and 30 parts of the sub-score displayed would be based at least in part upon the current epoch's (e.g., the current month's) actual performance (e.g., this is the current epoch driver score). In this way, as the driver takes additional trips during the current epoch, the sub-scores continue to be more and more determined based at least in part upon the driver's actual driving (e.g., what driving has occurred in the current epoch versus the previous epoch). In scenarios where drivers do not drive the set value of trip minutes (e.g., 900 minutes), telematics server 110 would blend a proportional amount of actual driving the driver actually engaged in for the current epoch. Such drivers would likely experience positive hybrid epoch driver scores regardless of how they drove (e.g., quality of driving) due to getting nearly positive results for time-based driving factors (e.g., quantity of driving). Additionally, drivers whose sub-scores were similar to what they were in the previous epoch (e.g., previous month) would see no impact regardless of how many minutes they drove in the current epoch (e.g., current month).

The sub-score algorithm provides an accurate model, especially when the driver has driven the set value of tip minutes (e.g., 900 minutes). Each trip may cause the telematics server 110 to change the driver's sub-score (as described above), which can lead to low variability of the sub-scores. In some examples, at the beginning of an epoch (e.g., beginning of a month), a driver's sub-score would be stable. An additional benefit of the sub-score algorithm is that the driver sub-scores are comparable. That is, any driver can compare his or her sub-score with any other driver such that the comparison would be one-to-one (for users having the same set value of trip minutes). In some examples, a user with a braking score of 85 may be determined as a better driver at braking than a driver with a braking score of 75 (given a measurement of braking on a 0 to 100 scale). Further, in the sub-score algorithm, trips with high quality driving may cause sub-scores to increase. In contrast, trips with low quality driving trips may cause the sub-scores to decrease. This provides for a reliable and repeatable (and intuitive to the end-user/driver) approach to determining a hybrid epoch driver score.

As a further example, a driver-focused scoring algorithm may be used to generate a hybrid epoch driver score. In the driver-focused scoring algorithm, telematics server 110 predicts a driver score of a driver for a current epoch based at least in part upon age, expected driving quality, expected driving quantity, number of vehicles, vehicle type, and/or other possible factors. In some examples, presume a driver is 35 years old, has one vehicle, and, as determined from telematics data of previous epochs, drives 1800 minutes (e.g. one hour per day for an epoch period of one month). Given only the driver's previous trip minutes per epoch (e.g., 1800 in this example) and the above presumptions, telematics server 110 may determine the predicted epoch driver score of the driver for the current epoch (e.g., the current epoch). The telematics server 110 may then determine, from the driver's telematics data, the number of minutes (n_minutes) the driver has driven for the current epoch (e.g., current month). The telematics server 110 may also determine, from the driver's past epoch telematics data, a number of driving minutes that the driver typically drives in a typical month (t). In some examples, t can equal 900 minutes if the driver usually drives 900 minutes in an epoch (e.g., past months). From the above, a hybrid epoch driver score may be determined for the driver by telematics server 110, where t equals 900, by determining (n_minutes/900)*predicted_epoch_driver_score+((900−n_minutes)/900)*predicted_epoch_driver_score. In this way, the driver-focused scoring algorithm will cause the telematics server 110 to determine a hybrid epoch driver score with a better value indicating a higher quality driver with higher quality trips, and vice-versa.

With the driver-focused scoring algorithm, hybrid epoch driver scores are not impacted by the quantity of driving. Instead, the score is only impacted based at least in part upon how the person drives (e.g., quality of driving), which means that if several days pass and no trips are logged (via telematics data as described herein), then a person's driving score will not change. In some examples, if a driver's initial, presumed, or predicted driving epoch score is 50 (on a scale from 0 to 100), but the telematics server 110 later determines, from the telematics data, that the driver's actual driving ability is 10, then how quickly the driver's score drops to 10 is based at least in part upon how often the driver drives (because the driver-focused scoring algorithm needs trips/telematics data to update). On the other hand, if the driver drives frequently (e.g., drives 900 minutes in the first week of the month, where t equals 900), then the initial score of 50 would no longer even factor into telematics server 110's determination. In addition, with the driver-focused scoring algorithm, the hybrid epoch driver score remains stable. In some examples, a single trip has only a small impact on a driver's score. Rarely would a driver score increase or decrease by several points as a result of any single long trip. In this way, with the driver-focused scoring algorithm, a driver is always competing with his or her performance in the prior epoch (e.g., prior month). If the person drives better (e.g., higher quality driving) than last epoch (e.g., last month), the driver's hybrid epoch driver score will go up. Such information can be reported to the driver in real-time, near real-time, or after the completion of vehicle trip(s) as described herein.

In some embodiments, it may be determined that additional data are needed to generate the predicted driver epoch score (209*a*). Such data may include additional feature data for training a machine learning model as described herein. Such determination may be made when there is insufficient data to generate an accurate prediction. In any event, such additional data may be combined with the telematics data collected by mobile device 106*m* in order to generate the hybrid epoch driver predictions or other predictions described herein. In some examples, telematics data of other drivers, as stored or collect by remote platforms and/or third parties (e.g., remote platform 112) may be downloaded or otherwise received by telematics server 110 (209*b*).

Telematics server 110 may transmit to a telematics mobile application (app) 201 the hybrid epoch driver score (212) to report the score to the driver (or another end-user). The transmission may be made in real-time or near real-time as the driver operates during, and/or completes, trips. The telematics mobile application 201 may be configured to display the hybrid epoch driver score on the display via the GUI. In addition, the telematics mobile application may render or generate a guided user interface (GUI) on a display of the telematics device. The GUI may include one or more screens, including GUI control screens or controls, to allow for manipulation of the telematics mobile application by a user, such as by a driver of one or more vehicles of the one or more trips.

In various embodiments, telematics mobile app 201 may be a downloadable application that executes on a mobile device phone (e.g., mobile device 106*m*) or another personal electronic device. In some examples, telematics mobile app 201 collect or cause to collect, telematics data as described herein. In some embodiments, during a collection period, telematics mobile app 201 does may not need a personal electronic device (e.g., mobile device 106*m*) to be mounted or otherwise affixed to the vehicle (e.g., vehicle 108). To this end, telematics mobile app 201 enables mobile device 106*m* and/or telematics server 110 to isolate the motion of the vehicle from the motion of the personal electronic device, as may be determined by the telematics data, via each respective device. As a result, telematics mobile app 201 is able to meaningfully interpret collected sensor or telematics data regardless of the particular orientation of mobile device 106*m*.

As described herein, telematics mobile app 201 may collect and transmit the telematics/sensor data to telematics server 110. Telematics server 110 is configured to analyze the telematics/sensor data to determine or generate information regarding the quality (e.g., how the vehicle was driven) and/or quantity (e.g., how much the vehicle was drive) of the data. In some examples, telematics server 110 may identify periods of time indicative of mobile device 106*m* being located within a vehicle in motion. As another example, the telematics server 110 may analyze the telematics/sensor data generated during the identified periods to determine driving performance, such as acceleration, braking, and/or cornering performance (e.g., quality of driving). Said another way, after the telematics data are received (204), telematics server 110 may process the telematics/sensor data collected during a particular driving period or trip to derive driving information.

In various embodiments, telematics server 110 may implement a representative state transfer (RESTful) application programming interface (API) that exposes the telematics data and/or driver scores to be pushed and/or pulled via telematics mobile app 201 as descried herein. In some examples, telematics mobile app 201 may access the hybrid epoch driver score, and/or related data, by pulling or requesting such data from the RESTful API. In certain embodiments, telematics mobile app 201 may access hybrid epoch driver scores, and/or relate data, by receiving pushed GUI values from the RESTful API, where a connection, channel or session was established between telematics mobile app 201 and telematics server 110.

In some embodiments, the telematics mobile app 201 may leverage an API of the operating system executing on the personal electronic device to detect when the personal electronic device is in motion. In some examples, telematics mobile app 201 may utilize the API to wake mobile device 106*m* in response to the operating system detecting a location change. To this end, the operating system may detect the major or significant location change by determining that the position of the mobile device 106*m* has moved a threshold distance or if a base station, in communication with, and servicing the mobile device 106m changes. Upon receiving an indication that the operating system detected the major location change, the telematics mobile app 201 may begin collecting, recording, and/or transmitting sensor or telematics data generated by sensors of the mobile device 106m or other sensors as described herein. Telematics mobile app 201 may then wait until mobile device 106m has been stationary for a threshold amount of time before the telematics mobile app 201 stops collecting sensor/telematics data.

In some embodiments, the operating system of mobile device 106m, via a third party or other API, may automatically report when the motion of the mobile device 106m is indicative of the mobile device 106m being located within a vehicle (e.g., vehicle 108) in motion (as opposed to being carried by an end user that is walking or biking). Upon detecting an API event indicating that the mobile device 106m is within a vehicle in motion, the telematics mobile app 201 may begin collecting telematics/sensor data generated by sensors of mobile device 106m. During a driving period, the telematics mobile app 201 may collect telematics/sensor data generated by various sensors of the mobile device 106m, or other sensors as describes herein, and may store the collected sensor data in application memory and/or transmits it to telematics server 110.

Additionally, in still further embodiments, the operating system, via a third party or other API, may also automatically report when the motion of mobile device 106m is indicative of mobile device 106m no longer begin within the vehicle in motion. Accordingly, in such embodiments, telematics mobile app 201 may cease recording the sensor data upon detecting the API event indicating that mobile device 106m is no longer within a vehicle in motion.

Figure 3:
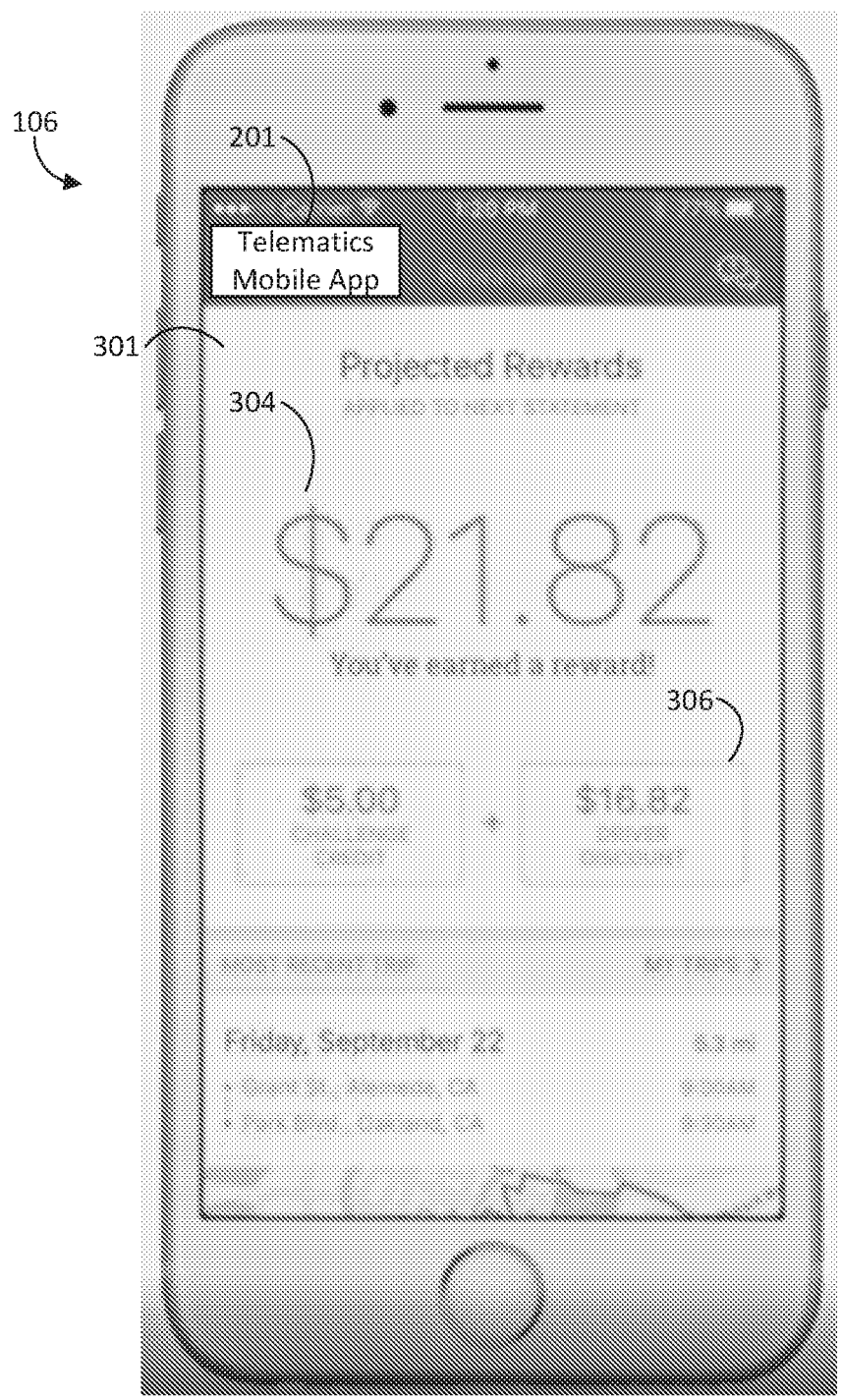
FIG. 3 is a simplified diagram showing a telematics mobile app rendering a guided user interface (GUI) on a display of a telematics device, according to various embodiments of the present disclosure.

FIG. 3 illustrates telematics mobile app 201 rendering a guided user interface (GUI) 301 on a display of the telematics device 106 of FIG. 1A and FIG. 1B in accordance with various embodiments disclosed herein. In the embodiment of FIG. 3, telematics mobile app 201 executes on a mobile device (e.g., mobile device 106m), such as a mobile smartphone as described herein. In the embodiment of FIG. 3, telematics mobile app 201 uses a hybrid epoch driver score, as received from telematics server 110, to determine a driver discount amount 306 (e.g., "$16.82"). The driver discount is then used to determine a projected reward 304 (e.g., "$21.82"). As described herein, the hybrid epoch driver score (and hence the values of the driver discount and projected reward) are based at least in part upon each of the previous epoch driver score and a predicted driver epoch score, as determined and provided by telematics server 110. As described herein, each of these values may each change with the amount of remaining time in the current epoch and the driver's actual driving activity, which may cause a change in the predicted driver epoch score (and, thus, the hybrid epoch driver score). Accordingly, the driver discount 306 and projected reward 304, as displayed by telematics mobile app 201, may each fluctuate and/or change in real-time, near-time, or on a per-trip-basis as each of the previous epoch driver score and a predicted driver epoch score are accessed, determined, generated, and/or regenerated by the telematics server 110, and provided to telematics mobile app 201. In some examples, in the embodiment of FIG. 3, telematics mobile app 201 shows a completed trip on Friday, September 22 of a distance of 5.3 miles. This trip may have caused the hybrid epoch driver score to be recomputed, transmitted to mobile device 106, and then rendered and displayed (e.g., as driver discount 306 and projected reward 304) as described herein.

Figure 4:
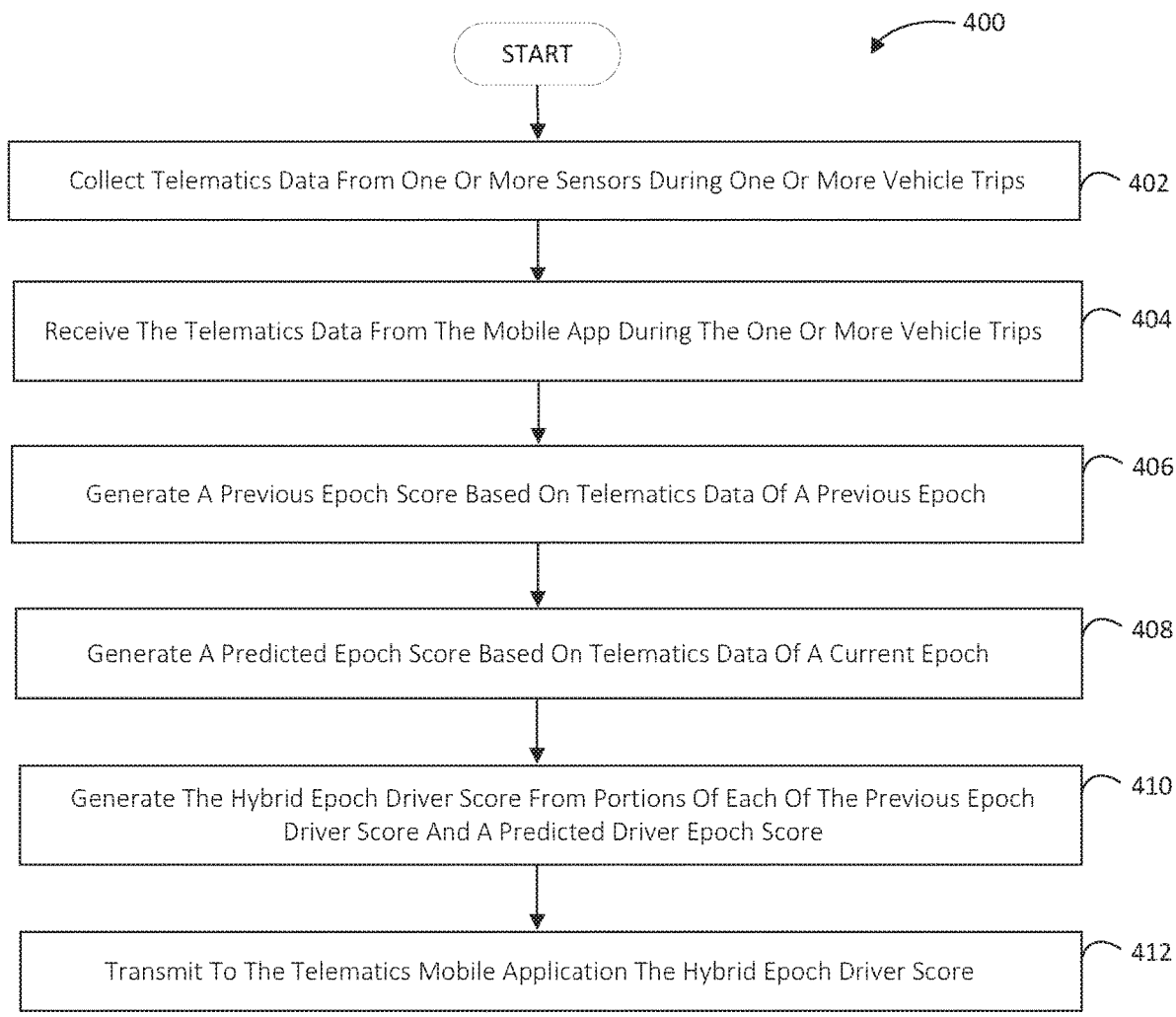
FIG. 4 is a simplified diagram showing a telematics method for generating hybrid epoch driver predictions, according to various embodiments of the present disclosure.

FIG. 4 illustrates a flow diagram of a telematics method 400 for generating hybrid epoch driver predictions in accordance with various embodiments disclosed herein. At block 402, a telematics mobile application (e.g., telematics mobile application 201) executes on a telematics device (e.g., mobile device 106m) to collect telematics data from one or more sensors during one or more trips.

At block 404, a telematics server (e.g., telematics server 110) receives the telematics data from the telematics mobile application (e.g., telematics mobile application 201) during the one or more trips.

At block 406, the telematics server (e.g., telematics server 110) executes instructions causing the telematics server to generate or determine a previous epoch score of a previous epoch (e.g., a previous month, week, etc.) from telematics data defined over one or more actual trips of a driver during the previous epoch. As described herein, in some embodiments, the previous epoch score may relate to, or be used to generate, a rate or discount associated with a product or service (e.g., a rate or discount associated with an insurance policy of the driver), for example as described for FIG. 3.

At block 408, the telematics server (e.g., telematics server 110) executes instructions causing the telematics server to generate or determine a predicted epoch driver score for a current epoch (e.g., a current month, week, etc.). In method 400, the telematics server determines the predicted epoch driver score based at least in part upon a remaining (future) time period of the current epoch. In particular, in method 400, the predicted epoch driver score is determined from each of (1) telematics data defined over one or more actual trips of the driver during the current epoch, and (2) and telematics data predicted over one or more expected trips of the driver during the current epoch. In some examples, one or more expected trips (or total time value for such trips) may be predicted for the driver for the remaining (future) current epoch time (e.g., the period of time for the current epoch that has not yet elapsed). The expected set of trips may be determined based at least in part upon the driver's past driving behavior as determined from past telematics data (e.g., from telematics data of one or more previous epochs). In various embodiments, both quantity and/or quality metrics of the user's past driving behavior may be generated using artificial intelligence or similar techniques, including statistical or regression analysis, machine-learning, natural networks, etc. as described herein.

At block 410, telematics server (e.g., telematics server 110) executes instructions causing the telematics server to generate a hybrid epoch driver score from portions of each of the previous epoch driver score and a predicted driver epoch score. In various embodiments, a blended, weighted, or otherwise hybrid score is generated by one or more algorithms using each of the previous epoch driver score and a predicted driver epoch score. In some examples, the proportionate predicted (future) epoch driver score is determined for the current epoch and is weighted or proportioned according to the remaining current epoch time. Similarly, a proportionate previous epoch driver score is determined for the previous epoch and is also weighted or proportioned according to the remaining current epoch time. A greater remaining current epoch time may cause a greater weighting or proportion of the previous epoch driver score to influence the hybrid epoch driver score. In contrast, a lesser remaining current epoch time may cause a lesser weighting or proportion of the previous epoch driver score to influence the hybrid epoch driver score.

At block 412, the telematics server (e.g., telematics server 110) transmits to the telematics mobile application (e.g., telematics mobile application 201) the hybrid epoch driver score. The transmission may be made in real-time or near real-time as the driver operates during, and/or completes, trips. The telematics mobile application may be configured to display the hybrid epoch driver score on the display via the GUI, as shown and described, in some examples, for FIG. 3.

With the foregoing, a user of the above telematics systems and methods who is an insurance customer or user may opt-in to rewards, insurance discount, or other type of program. After the insurance customer provides their permission or affirmative consent, an insurance provider telematics application and/or remote server may collect telematics and/or other data (including image or audio data) associated with insured assets, including before, during, and/or after an insurance-related event or vehicle accident, such as any event, etc., as may be determined from the vehicular telematics data, GUI values, environment data, vehicle status data, or other information or data as described herein. In return, risk adverse drivers, and/or vehicle owners may receive discounts or insurance cost savings related to auto, home, life, and other types of insurance from the insurance provider.

In certain examples, a general risk score is calculated based at least in part upon telematics data, which may be similar (e.g., in effect) to a credit score, such as a score indicative of risk associated with a particular user. For example, a method of creating a general risk score includes training a model, such as a model that is configured to simultaneously predict a multitude of risk scores across a diverse set of use cases. The training may include training a neural network that has a hidden layer with a single hidden node and additional layers being used to predict the multitude of risk scores (e.g., multi-target prediction). In some examples, the general risk score may be a vector of scores instead of a single score, such as by expanding the size of the hidden layer with a single node to be a hidden layer with multiple nodes. In certain examples, having multitude of scores allows for greater resolution in unique scoring attributes. While a neural network may be used, other models for predicting each task may also be used, such as using principal component analysis or a similar technique on the vector of predictions to find the n components that best explain the variance of the full-set of predictions.

In one aspect, telematics data, and/or other data, including the types of data discussed elsewhere herein, may be collected or received by an insured's mobile device or smart vehicle, a Telematics Application running thereon, and/or an insurance provider remote server, such as via direct or indirect wireless communication or data transmission from a Telematics Application ("App") running on the insured's mobile device or smart vehicle, after the insured or customer affirmatively consents or otherwise opts-in to an insurance discount, reward, or other program. The insurance provider may then analyze the data received with the customer's permission to provide benefits to the customer. As a result, risk adverse customers may receive insurance discounts or other insurance cost savings based at least in part upon data that reflects low risk driving behavior and/or technology that mitigates or prevents risk to (i) insured assets, such as vehicles or even homes, and/or (ii) vehicle operators or passengers.

Additional aspects include a telematics cloud platform receiving telematics data and/or geographic location data from a large number of mobile computing devices (e.g., 100 or more), and issuing alerts to those mobile computing devices in which the alerts are relevant in accordance with the various techniques described herein.

Figure 5:
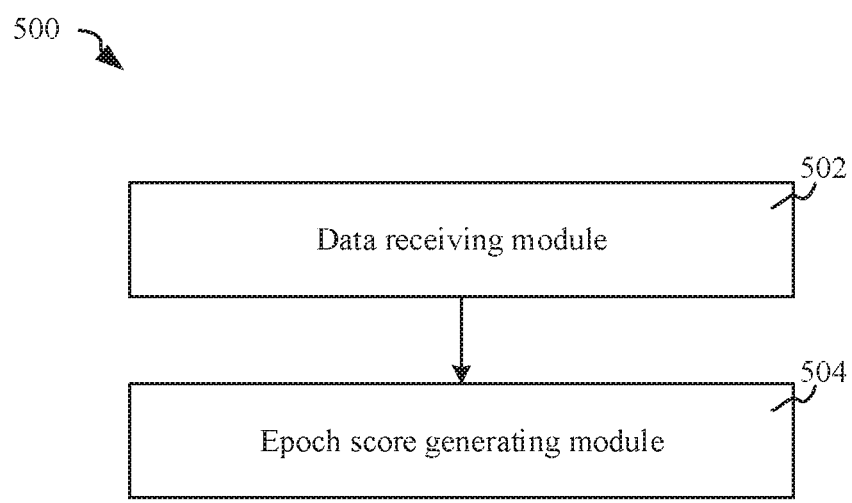
FIG. 5 is a simplified diagram showing a system for generating a hybrid epoch score, according to various embodiments of the present disclosure.

One or More Systems for Generating a Hybrid Epoch Score According to Various Embodiments FIG. 5 is a simplified diagram showing a system 500 for generating a hybrid epoch score, according to various embodiments of the present disclosure. This diagram is merely an example, which should not unduly limit the scope of the claims. One of ordinary skill in the art would recognize many variations, alternatives, and modifications. In some examples, the system 500 includes a data receiving module 502 and an epoch score generating module 504. In certain examples, the system 500 is configured to implement method 600 of FIG. 6. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the data receiving module 502 is configured to receive, such as from a mobile device associated with the user and/or from a server, prior telematics data indicative of the operation of a vehicle by the user during one or more prior trips in a prior epoch. In various examples, the data receiving module 502 is configured to receive, such as from the mobile device and/or a server, recent telematics data indicative of the operation of the vehicle by the user during one or more recent trips in a current epoch.

In various embodiments, the epoch score generating module 504 is configured to generate a prior epoch score based at least in part upon the prior telematics data. In various examples, the epoch score generating module 504 is configured to generate a partial current epoch score based at least in part upon the recent telematics data. In various examples, the epoch score generating module 504 is configured to generate a hybrid current epoch score based at least in part upon the prior epoch score and the partial current epoch score.

In some examples, the prior epoch is associated with a prior epoch time. In some examples, the one or more recent trips is associated with a recent driving time and an elapsed time. In certain examples, the recent driving time is the amount of time the vehicle was under operation in the current epoch, and/or the elapsed time is the amount of time that has passed in the current epoch. In some embodiments, the epoch score generating module 504 is configured to generate the hybrid current epoch score by at least: determining a remaining time of the current epoch as the prior epoch time minus the elapsed time, and determining the hybrid current epoch. In various examples, the hybrid current epoch is determined based at least in part upon adding the prior epoch score multiplied by the remaining time and the partial current epoch score multiplied by the recent driving time. For example, the hybrid current epoch may equal to the addition of the prior epoch score multiplied by the remaining time and the partial current epoch score multiplied by the recent driving time. Note that a remaining time, a driving time, and/or an elapsed time may be a time ratio of an epoch time (e.g., of a prior epoch or of a current epoch).

In some examples, the current epoch is associated with a plurality of time segments. In various examples, each recent trip of the plurality of recent trips is associated with one or more time segments of the plurality of time segments. In some embodiments, the epoch score generating module 504 is configured to generate the partial current epoch score by at least: assigning each segment of the plurality of time segments with the prior epoch score, generating, for each recent trip of the plurality of recent trips, a partial current epoch score based at least in part upon the recent telematics data; and updating, for each recent trip of the plurality of recent trips, the associated one or more time segments with the associated partial current epoch score. In some embodiments, the epoch score generating module 504 is configured to generate the hybrid current epoch score based at least in part upon: the partial current epoch score for each segment of the plurality of time segments that was updated; and the prior epoch score for each segment of the plurality of time segments that was not updated. For example, the hybrid current epoch score may be generated as equal to an average epoch score across all segments of the plurality of time segments.

In some embodiments, the data receiving module 502 is further configured to receive, such as from the mobile device and/or a server, historic telematics data indicative of the operation of the vehicle by the user during one or more historic trips in one or more historic epochs. In various examples, the one or more recent trips is associated with a recent driving time and an elapsed time, the recent driving time being the amount of time the vehicle was under operation in the current epoch, and/or the elapsed time being the amount of time that has passed in the current epoch. In some embodiments, the epoch score generating module 504 is configured to determine a historic epoch time based at least in part upon the historic telematics data, the historic epoch time being the average total time of a historic epoch of the one or more historic epochs. In some embodiments, the epoch score generating module 504 is configured to generate the hybrid current epoch score by at least: determining a remaining time of the current epoch as the historic epoch time minus the elapsed time; and determining the hybrid current epoch score based at least in part upon adding: the partial current epoch score multiplied by a ratio of the elapsed time to a time historically driven per epoch and the prior epoch score multiplied by a ratio of the remaining time to the time historically driven per epoch. For example, the hybrid current epoch score may be determined as equal to the addition of the partial current epoch score multiplied by the ratio of the elapsed time to the time historically driven per epoch and the prior epoch score multiplied by the ratio of the remaining time to the time historically driven per epoch.

Figure 6:
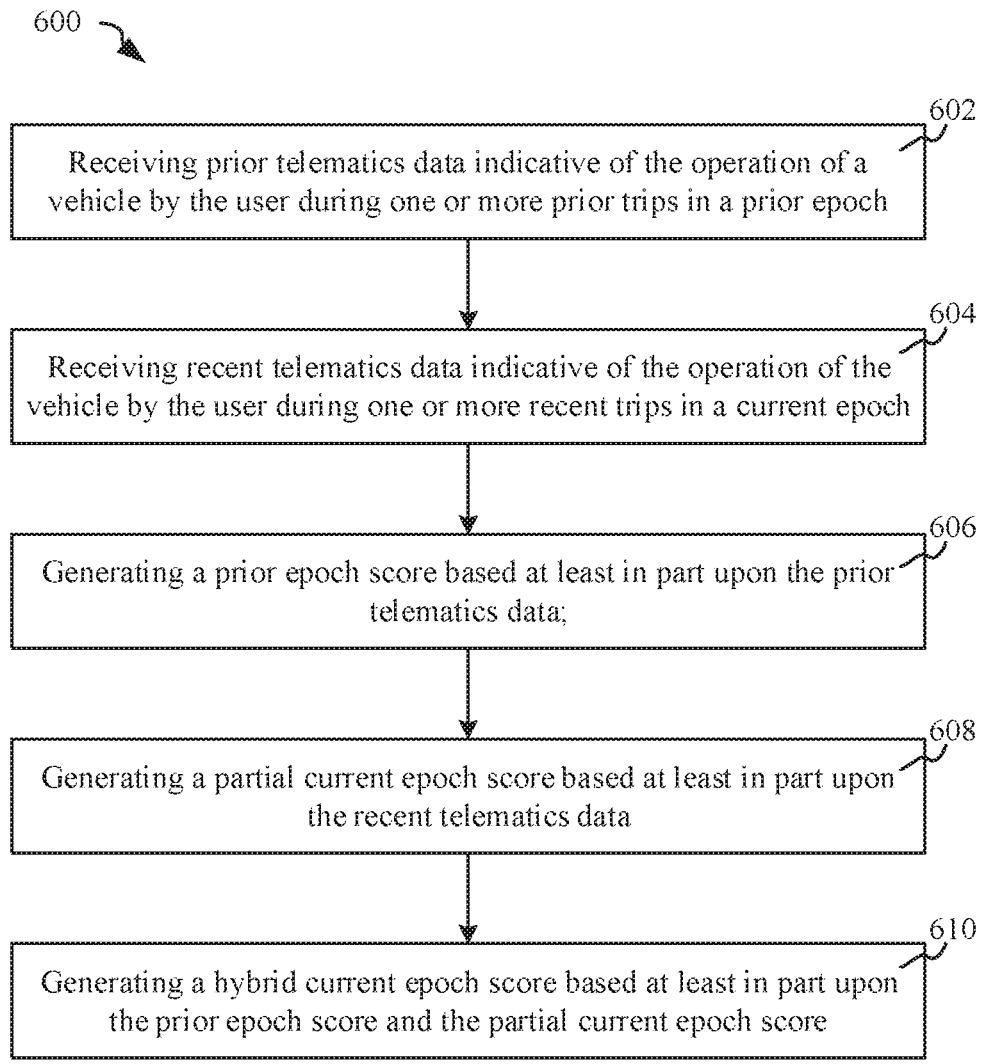
FIG. 6 is a simplified diagram showing a method for generating a hybrid epoch score, according to various embodiments of the present disclosure.

One or More Methods for Generating a Hybrid Epoch Score According to Various Embodiments FIG. 6 is a simplified method for generating a hybrid epoch score, according to various embodiments of the present disclosure. This diagram is merely an example, which should not unduly limit the scope of the claims. One of ordinary skill in the art would recognize many variations, alternatives, and modifications. The method 600 includes a process 602 of receiving, such as from a mobile device associated with the user or from a server, prior telematics data indicative of the operation of a vehicle by the user during one or more prior trips in a prior epoch, a process 604 of receiving, such as from the mobile device or a server, recent telematics data indicative of the operation of the vehicle by the user during one or more recent trips in a current epoch, a process 606 of generating a prior epoch score based at least in part upon the prior telematics data, a process 608 of generating a partial current epoch score based at least in part upon the recent telematics data, and a process 610 of generating a hybrid current epoch score based at least in part upon the prior epoch score and the partial current epoch score. In certain examples, the method 600 is configured to be implemented by system 500 of FIG. 5. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

In some examples, the prior epoch is associated with a prior epoch time. In some examples, the one or more recent trips is associated with a recent driving time and an elapsed time. In some examples, the recent driving time being the amount of time the vehicle was under operation in the current epoch, and/or the elapsed time being the amount of time that has passed in the current epoch. In some embodiments, the process 610 of generating a hybrid current epoch score includes: determining a remaining time of the current epoch as the prior epoch time minus the elapsed time; and determining the hybrid current epoch based at least in part upon adding: the prior epoch score multiplied by the remaining time and the partial current epoch score multiplied by the recent driving time. For example, determining the hybrid current epoch includes determining the hybrid current epoch to be equal to the addition of the prior epoch score multiplied by the remaining time and the partial current epoch score multiplied by the recent driving time.

In some examples, the current epoch is associated with a plurality of time segments. In some examples, each recent trip of the plurality of recent trips is associated with one or more time segments of the plurality of time segments. In some embodiments, the process 608 of generating the partial current epoch score includes: assigning each segment of the plurality of time segments with the prior epoch score; generating, for each recent trip of the plurality of recent trips, a partial current epoch score based at least in part upon the recent telematics data; and updating, for each recent trip of the plurality of recent trips, the associated one or more time segments with the associated partial current epoch score. In some embodiments, the process 610 of generating the hybrid current epoch score includes generating the hybrid current epoch based at least in part upon: the partial current epoch score for each segment of the plurality of time segments that was updated; and the prior epoch score for each segment of the plurality of time segments that was not updated. For example, determining the hybrid current epoch includes determining the hybrid current epoch to be equal to an average epoch score across all segments of the plurality of time segments.

In some embodiments, the method 600 further includes receiving, such as from the mobile device and/or a server, historic telematics data indicative of the operation of the vehicle by the user during one or more historic trips in one or more historic epochs. In some embodiments, the method 600 further includes determining a historic epoch time based at least in part upon the historic telematics data, the historic epoch time being the average total time of a historic epoch of the one or more historic epochs. In various examples, the one or more recent trips is associated with a recent driving time and an elapsed time, the recent driving time being the amount of time the vehicle was under operation in the current epoch, and/or the elapsed time being the amount of time that has passed in the current epoch. In some embodiments, the process 610 of generating the hybrid current epoch score includes: determining a remaining time of the current epoch as the historic epoch time minus the elapsed time; and determining the hybrid current epoch based at least in part upon adding: the partial current epoch score multiplied by a ratio of the elapsed time to a time historically driven per epoch; and the prior epoch score multiplied by a ratio of the remaining time to the time historically driven per epoch. For example, determining the hybrid current epoch includes determining the hybrid current epoch to be equal to the addition of the partial current epoch score multiplied by the ratio of the elapsed time to the time historically driven per epoch and the prior epoch score multiplied by the ratio of the remaining time to the time historically driven per epoch.

One or More Computer Devices According to Various Embodiments

Figure 7:
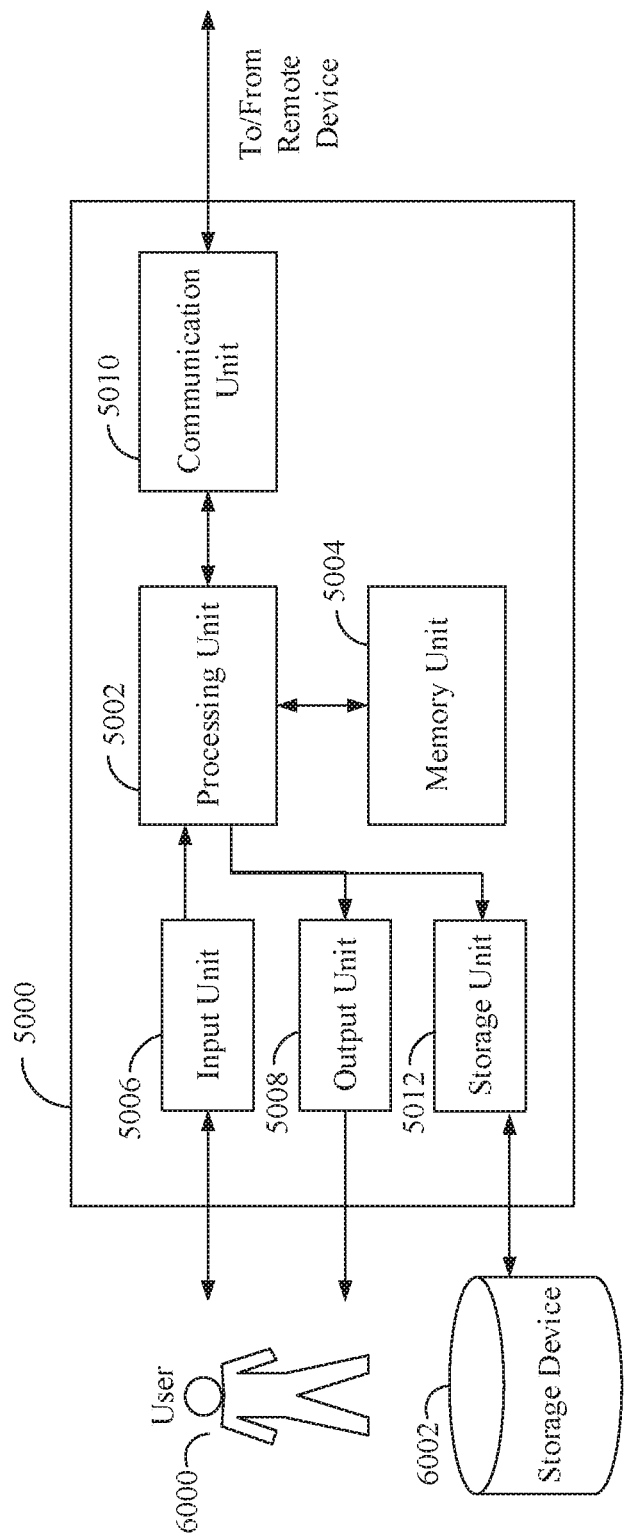
FIG. 7 is a simplified diagram showing a computer device, according to various embodiments of the present disclosure.

FIG. 7 is a simplified diagram showing a computer device 5000, according to various embodiments of the present disclosure. This diagram is merely an example, which should not unduly limit the scope of the claims. One of ordinary skill in the art would recognize many variations, alternatives, and modifications. In some examples, the computer device 5000 includes a processing unit 5002, a memory unit 5004, an input unit 5006, an output unit 5008, and a communication unit 5010. In various examples, the computer device 5000 is configured to be in communication with a user 5100 and/or a storage device 5200. In certain examples, the system computer device 5000 is configured according to system 500 of FIG. 5, and/or to implement method 600 of FIG. 6. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 600 of FIG. 6. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C #, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computer device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computer System Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computer device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Computer Systems According to Various Embodiments

Figure 8:
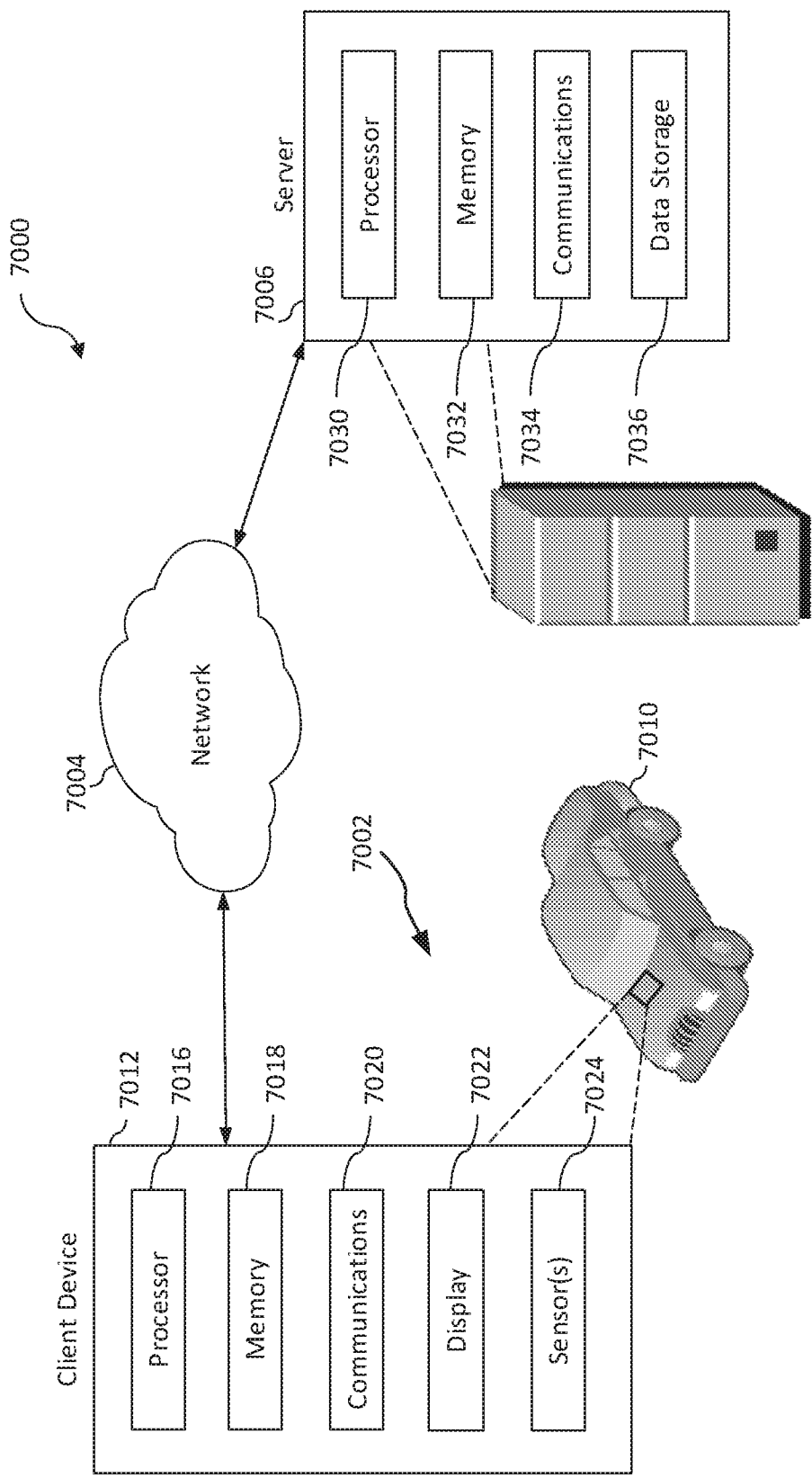
FIG. 8 is a simplified diagram showing a computer system, according to various embodiments of the present disclosure.

FIG. 8 is a simplified computer system 7000 according to various embodiments of the present disclosure. This diagram is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured according to system 500 of FIG. 5, and/or to implement method 600 of FIG. 6. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes a processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more trips, the vehicle 7010 by at least collecting data associated with one or more operating parameters of the vehicle, such as speed, acceleration, braking, location, engine status, and/or other suitable parameters. In certain examples, the collected data include vehicle telematics data. According to some embodiments, the data are collected continuously, at predetermined time intervals, and/or based on one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes a processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by the processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012, and stores the data in the data storage 7036. In some examples, the server 7006 is further configured to process, via the processor 7030, the data to perform one or more processes of the methods of the present disclosure.

One or More Examples of Machine Learning According to Various Embodiments

According to some embodiments, a processor or a processing element may be trained using supervised machine learning and/or unsupervised machine learning, and the machine learning may employ an artificial neural network, which, in some examples, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In various examples, one or more processes of the methods of the present disclosure are performed by one or more machine learning models, such as one or more neural networks. In various examples, one or more modules of the systems of the present disclosure perform actions by one or more machine learning models, such as one or more neural networks.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

Examples of Certain Embodiments of the Present Disclosure

According to various embodiments, a computer-implemented method for generating a hybrid epoch score for a user includes: receiving, from a mobile device associated with the user, prior telematics data indicative of the operation of a vehicle by the user during one or more prior trips in a prior epoch; receiving, from the mobile device, recent telematics data indicative of the operation of the vehicle by the user during one or more recent trips in a current epoch; generating a prior epoch score based at least in part upon the prior telematics data; generating a partial current epoch score based at least in part upon the recent telematics data; and generating a hybrid current epoch score based at least in part upon the prior epoch score and the partial current epoch score. In various examples, the computer-implemented method is implemented accordingly to method 600 of FIG. 6 and/or is implemented by system 500 of FIG. 5.

According to some embodiments, the prior epoch is associated with a prior epoch time; the one or more recent trips is associated with a recent driving time and an elapsed time, the recent driving time being the amount of time the vehicle was under operation in the current epoch, the elapsed time being the amount of time that has passed in the current epoch. In various examples, the generating the hybrid current epoch score includes: determining a remaining time of the current epoch as the prior epoch time minus the elapsed time; and determining the hybrid current epoch score based at least in part upon adding: the prior epoch score multiplied by the remaining time; and the partial current epoch score multiplied by the recent driving time.

According to some embodiments, the current epoch is associated with a plurality of time segments; each recent trip of the plurality of recent trips is associated with one or more time segments of the plurality of time segments. In various examples, the generating the partial current epoch score includes: assigning each segment of the plurality of time segments with the prior epoch score; generating, for each recent trip of the plurality of recent trips, a partial current epoch score based at least in part upon the recent telematics data; and updating, for each recent trip of the plurality of recent trips, the associated one or more time segments with the associated partial current epoch score. In various examples, the generating the hybrid current epoch score includes generating the hybrid current epoch score based at least in part upon: the partial current epoch score for each segment of the plurality of time segments that was updated; and the prior epoch score for each segment of the plurality of time segments that was not updated.

According to some embodiments, the computer-implemented method further includes: receiving, from the mobile device and/or a server, historic telematics data indicative of the operation of the vehicle by the user during one or more historic trips in one or more historic epochs; and determining a historic epoch time based at least in part upon the historic telematics data, the historic epoch time being the average total time of a historic epoch of the one or more historic epochs. In various examples, the one or more recent trips is associated with a recent driving time and an elapsed time, the recent driving time being the amount of time the vehicle was under operation in the current epoch, the elapsed time being the amount of time that has passed in the current epoch. In various examples, the generating the hybrid current epoch score includes: determining a remaining time of the current epoch as the historic epoch time minus the elapsed time; and determining the hybrid current epoch score based at least in part upon adding: the partial current epoch score multiplied by a ratio of the elapsed time to a time historically driven per epoch; and the prior epoch score multiplied by a ratio of the remaining time to the time historically driven per epoch.

According to some embodiments, the prior telematics data include: prior qualitative data indicative of one or more prior driving behaviors of the user during the one or more prior trips; and prior quantitative data indicative of a prior driving time in the prior epoch; the recent telematics data include: recent qualitative data indicative of one or more recent driving behaviors of the user during the one or more recent trips; and recent quantitative data indicative of a recent driving time in the current epoch. In various examples, the generating the prior epoch score includes generating the prior epoch score based at least in part upon the prior qualitative data and the prior quantitative data. In various examples, the generating the partial current epoch score includes generating the partial current epoch score based at least in part upon the recent qualitative data and the recent quantitative data. In various examples, the generating the hybrid current epoch score includes generating the hybrid current epoch score based at least in part upon the prior qualitative data, the prior quantitative data, the recent qualitative data, and the recent quantitative data.

According to some embodiments, the receiving the recent telematics data includes receiving the recent telematics data in real-time, in near real-time, after completion of each recent trip of the one or more recent trips, continuously, and/or at a pre-determined time. In various examples, generating the partial current epoch score includes: generating the partial current epoch score in real-time, in near real-time, after completion of each recent trip of the one or more recent trips, continuously, and/or at a pre-determined time; and generating the hybrid current epoch score includes generating the hybrid current epoch score in real-time, in near real-time, after completion of each recent trip of the one or more recent trips, continuously, and/or at a pre-determined time.

According to some embodiments, the computer-implemented method further includes: receiving third-party information associated with the one or more prior trips and/or the one or more recent trips. In some examples, generating the prior epoch score includes generating the prior epoch score based at least in part upon the prior telematics data and the third-party information; and/or generating the partial current epoch score includes generating the partial current epoch score based at least in part upon the recent telematics data and the third-party information.

According to some embodiments, the computer-implemented method further includes: presenting the hybrid current epoch score to the user via a display.

According to some embodiments, the computer-implemented method further includes: determining a rate or discount for an associated product or an associated service based at least in part upon the hybrid epoch score; and presenting the rate or discount to the user via a display.

According to some embodiments, the computer-implemented method further includes: determining a comparison result by at least comparing the hybrid epoch score of the user to hybrid epoch scores of one or more related users; and presenting the comparison result to the user via a display.

According to some embodiments, the computer-implemented method further includes: detecting, using one or more sensors associated with the mobile device, whether the vehicle is being operated by the user; and collecting, in response to detecting that the vehicle is being operated by the user, telematics data using the one or more sensors.

According to some embodiments, generating the prior epoch score includes: generating, using a neural network, the prior epoch score based at least in part upon the prior telematics data; generating the partial current epoch score includes generating, using a neural network, the partial current epoch score based at least in part upon the recent telematics data; and/or generating the hybrid current epoch score includes generating, using a neural network, the hybrid current epoch score based at least in part upon the prior epoch score and the partial current epoch score.

According to various embodiments, a system for generating a hybrid epoch score for a user includes: a data receiving module configured to: receive, from a mobile device associated with the user, prior telematics data indicative of the operation of a vehicle by the user during one or more prior trips in a prior epoch; and receive, from the mobile device, recent telematics data indicative of the operation of the vehicle by the user during one or more recent trips in a current epoch; and an epoch score generating module configured to: generate a prior epoch score based at least in part upon the prior telematics data; generate a partial current epoch score based at least in part upon the recent telematics data; and generate a hybrid current epoch score based at least in part upon the prior epoch score and the partial current epoch score. In various examples, the system is configured according to system 500 of FIG. 5 and/or configured to perform method 600 of FIG. 6.

According to some embodiments, the prior epoch is associated with a prior epoch time; the one or more recent trips is associated with a recent driving time and an elapsed time, the recent driving time being the amount of time the vehicle was under operation in the current epoch, the elapsed time being the amount of time that has passed in the current epoch. In various examples, the epoch score generating module is configured to generate the hybrid current epoch score by at least: determining a remaining time of the current epoch as the prior epoch time minus the elapsed time; and determining the hybrid current epoch score based at least in part upon adding: the prior epoch score multiplied by the remaining time; and the partial current epoch score multiplied by the recent driving time.

According to some embodiments, the current epoch is associated with a plurality of time segments; each recent trip of the plurality of recent trips is associated with one or more time segments of the plurality of time segments. In various examples, the epoch score generating module is configured to: generate the partial current epoch score by at least: assigning each segment of the plurality of time segments with the prior epoch score; generating, for each recent trip of the plurality of recent trips, a partial current epoch score based at least in part upon the recent telematics data; and updating, for each recent trip of the plurality of recent trips, the associated one or more time segments with the associated partial current epoch score; and generate the hybrid current epoch score based at least in part upon: the partial current epoch score for each segment of the plurality of time segments that was updated; and the prior epoch score for each segment of the plurality of time segments that was not updated.

According to some embodiments, the data receiving module is further configured to receive, from the mobile device and/or a server, historic telematics data indicative of the operation of the vehicle by the user during one or more historic trips in one or more historic epochs; the one or more recent trips is associated with a recent driving time and an elapsed time, the recent driving time being the amount of time the vehicle was under operation in the current epoch, the elapsed time being the amount of time that has passed in the current epoch. In various examples, the epoch score generating module is configured to: determine a historic epoch time based at least in part upon the historic telematics data, the historic epoch time being the average total time of a historic epoch of the one or more historic epochs; generate the hybrid current epoch score by at least: determining a remaining time of the current epoch as the historic epoch time minus the elapsed time; and determining the hybrid current epoch score based at least in part upon adding: the partial current epoch score multiplied by a ratio of the elapsed time to a time historically driven per epoch; and the prior epoch score multiplied by a ratio of the remaining time to the time historically driven per epoch.

According to some embodiments, the prior telematics data include: prior qualitative data indicative of one or more prior driving behaviors of the user during the one or more prior trips; and prior quantitative data indicative of a prior driving time in the prior epoch; the recent telematics data include: recent qualitative data indicative of one or more recent driving behaviors of the user during the one or more recent trips; and recent quantitative data indicative of a recent driving time in the current epoch. In various examples, the epoch score generating module is configured to: generate the prior epoch score based at least in part upon the prior qualitative data and the prior quantitative data. In various examples, the epoch score generating module is configured to generate the partial current epoch score based at least in part upon the recent qualitative data and the recent quantitative data. In various examples, the epoch score generating module is configured to generate the hybrid current epoch score based at least in part upon the prior qualitative data, the prior quantitative data, the recent qualitative data, and the recent quantitative data.

According to some embodiments, the data receiving module is configured to receive the recent telematics data in real-time, in near real-time, after completion of each recent trip of the one or more recent trips, continuously, and/or at a pre-determined time. In some examples, the epoch score generating module is configured to generate the partial current epoch score in real-time, in near real-time, after completion of each recent trip of the one or more recent trips, continuously, and/or at a pre-determined time. In some examples, the epoch score generating module is configured to generate the hybrid current epoch score in real-time, in near real-time, after completion of each recent trip of the one or more recent trips, continuously, and/or at a pre-determined time.

According to some embodiments, the data receiving module is further configured to receive third-party information associated with the one or more prior trips and/or the one or more recent trips. In some examples, the epoch score generating module is configured to generate the prior epoch score based at least in part upon the prior telematics data and the third-party information. In some examples, the epoch score generating module is configured to generate the partial current epoch score based at least in part upon the recent telematics data and the third-party information.

According to some embodiments, the system further includes a presenting module configured to present the hybrid current epoch score to the user via a display.

According to some embodiments, the system further includes a rate determining module configured to determine a rate or discount for an associated product or an associated service based at least in part upon the hybrid epoch score. In some examples, the system further includes a presenting module configured to present the rate or discount to the user via a display.

According to some embodiments, the system further includes a comparison module configured to determine a comparison result by at least comparing the hybrid epoch score of the user to hybrid epoch scores of one or more related users. In some examples, the system further includes a presenting module configured to present the comparison result to the user via a display.

According to some embodiments, the system further includes a detecting module configured to detect, using one or more sensors associated with the mobile device, whether the vehicle is being operated by the user. In some examples, the system further includes a collecting module configured to collect, in response to detecting that the vehicle is being operated by the user, telematics data using the one or more sensors.

According to some embodiments, the epoch score generating module is configured to: generate the prior epoch score, using a neural network, based at least in part upon the prior telematics data; generate, using a neural network, the partial current epoch score based at least in part upon the recent telematics data; and/or generate, using a neural network, the hybrid current epoch score based at least in part upon the prior epoch score and the partial current epoch score.

According to various embodiments, a non-transitory computer-readable medium with instructions stored thereon, that upon execution by a processor, causes the processor to perform: receiving, from a mobile device associated with the user, prior telematics data indicative of the operation of a vehicle by the user during one or more prior trips in a prior epoch; receiving, from the mobile device, recent telematics data indicative of the operation of the vehicle by the user during one or more recent trips in a current epoch; generating a prior epoch score based at least in part upon the prior telematics data; generating a partial current epoch score based at least in part upon the recent telematics data; and generating a hybrid current epoch score based at least in part upon the prior epoch score and the partial current epoch score. In various examples, the non-transitory computer-readable medium with instructions stored thereon, that upon execution by the processor, perform one or more processes according to method 600 of FIG. 6.

According to some embodiments, the non-transitory computer-readable medium, that upon execution of the processor, further causes the processor to perform: receiving, from the mobile device and/or a server, historic telematics data indicative of the operation of the vehicle by the user during one or more historic trips in one or more historic epochs; and determining a historic epoch time based at least in part upon the historic telematics data, the historic epoch time being the average total time of a historic epoch of the one or more historic epochs; wherein: the one or more recent trips is associated with a recent driving time and an elapsed time, the recent driving time being the amount of time the vehicle was under operation in the current epoch, the elapsed time being the amount of time that has passed in the current epoch; the generating the hybrid current epoch score includes: determining a remaining time of the current epoch as the historic epoch time minus the elapsed time; and determining the hybrid current epoch score based at least in part upon adding: the partial current epoch score multiplied by a ratio of the elapsed time to a time historically driven per epoch; and the prior epoch score multiplied by a ratio of the remaining time to the time historically driven per epoch.

According to some embodiments, the non-transitory computer-readable medium, that upon execution of the processor, further causes the processor to perform: receiving third-party information associated with the one or more prior trips and/or the one or more recent trips. In some examples, generating the prior epoch score includes: generating the prior epoch score based at least in part upon the prior telematics data and the third-party information; and/or generating the partial current epoch score includes generating the partial current epoch score based at least in part upon the recent telematics data and the third-party information.

According to some embodiments, the non-transitory computer-readable medium, that upon execution of the processor, further causes the processor to perform: presenting the hybrid current epoch score to the user via a display.

According to some embodiments, the non-transitory computer-readable medium, that upon execution of the processor, further causes the processor to perform: determining a rate or discount for an associated product or an associated service based at least in part upon the hybrid epoch score; and presenting the rate or discount to the user via a display.

According to some embodiments, the non-transitory computer-readable medium, that upon execution of the processor, further causes the processor to perform: determining a comparison result by at least comparing the hybrid epoch score of the user to hybrid epoch scores of one or more related users; and presenting the comparison result to the user via a display.

According to some embodiments, the non-transitory computer-readable medium, that upon execution of the processor, further causes the processor to perform: detecting, using one or more sensors associated with the mobile device, whether the vehicle is being operated by the user; and collecting, in response to detecting that the vehicle is being operated by the user, telematics data using the one or more sensors.

Additional Considerations According to Certain Embodiments

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing needs that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. In some examples, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. In some examples, where the hardware modules comprise a general-purpose processor configured using software, the general-purpose processor may be configured as respective different hardware modules at different times. Software may accordingly configure a processor, in some examples, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, in some examples, through the storage and retrieval of information in memory structures to which the multiple hardware modules have access. In some examples, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. In some examples, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in certain embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In certain embodiments, the one or more processors or processor-implemented modules may be distributed across a number of geographic locations.

Those of ordinary skill in the art will recognize that a wide variety of modifications, alterations, and combinations can be made with respect to the above described embodiments without departing from the scope of the disclosure, and that such modifications, alterations, and combinations are to be viewed as being within the ambit of the inventive concept.

Additional Considerations According to Various Embodiments

In certain embodiments, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. In some examples, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, in some examples, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are certain embodiments that are equivalent to the described embodiments. Accordingly, it is to be understood that the present disclosure is not to be limited by the specific illustrated embodiments.

What is claimed is:

1. A computer-implemented method for generating a hybrid current epoch score for a user, the computer-implemented method comprising:
   receiving prior telematics data indicative of an operation of a vehicle by the user during one or more prior trips in a prior epoch representing a first period of time associated with a first time unit;
   receiving, from a mobile device, recent telematics data indicative of the operation of the vehicle by the user during one or more recent trips in a current epoch representing a second period of time associated with a second time unit, the first time unit being same as the second time unit; and
   generating the hybrid current epoch score based at least in part upon (i) the prior telematics data and (ii) the recent telematics data.

2. The computer-implemented method of claim 1, further comprising:
   generating a current epoch score based at least in part upon the recent telematics data and a prior epoch score, wherein the current epoch score is a first current epoch score, and wherein generating the current epoch score further comprises:
      generating a second current epoch score by applying a trained machine learning model to the recent telematics data; and
      generating the first current epoch score using the second current epoch score and the prior epoch score.

3. The computer-implemented method of claim 1, wherein:
the prior epoch is associated with a prior epoch time;
the one or more recent trips are associated with a recent driving time and an elapsed time, the recent driving time being an amount of time the vehicle was under operation in the current epoch, the elapsed time being the amount of time that has passed in the current epoch; and
the computer-implemented method further comprises:
generating a current epoch score, comprising:
determining a remaining time of the current epoch as the prior epoch time minus the elapsed time; and
determining the current epoch score based at least in part upon a prior epoch score, the remaining time and the recent driving time.

4. The computer-implemented method of claim 1, wherein:
the current epoch is associated with a plurality of time segments;
each recent trip of the one or more of recent trips is associated with one or more time segments of the plurality of time segments; and
the computer-implemented method further comprises;
generating a current epoch score, comprising:
assigning each segment of the plurality of time segments with a prior epoch score;
generating, for each recent trip of the one or more recent trips, a trip current epoch score based at least in part upon the recent telematics data; and
updating, for each recent trip of the one or more recent trips, the one or more time segments that are associated with the each recent trip with the trip current epoch score that is associated with the each recent trip; and
generating the current epoch score based at least in part upon the trip current epoch score for each segment of the plurality of time segments that was updated and the prior epoch score for each segment of the plurality of time segments that was not updated.

5. The computer-implemented method of claim 1, further comprising:
receiving historic telematics data indicative of the operation of the vehicle by the user during one or more historic trips in one or more historic epochs; and
determining a historic epoch time based at least in part upon the historic telematics data, the historic epoch time being an average total time of a historic epoch of the one or more historic epochs;
wherein:
the one or more recent trips is associated with a recent driving time and an elapsed time, the recent driving time being an amount of time the vehicle was under operation in the current epoch, the elapsed time being the amount of time that has passed in the current epoch; and
the computer-implemented method further comprises:
generating a current epoch score, comprising:
determining a remaining time of the current epoch as the historic epoch time minus the elapsed time; and
determining the current epoch score based at least in part upon a ratio of the elapsed time to a time historically driven per epoch, a prior epoch score and a ratio of the remaining time to the time historically driven per epoch.

6. The computer-implemented method of claim 1, wherein:
the prior telematics data comprise at least one of:
prior qualitative data indicative of one or more prior driving behaviors of the user during the one or more prior trips; or
prior quantitative data indicative of a prior driving time in the prior epoch;
the recent telematics data comprise:
recent qualitative data indicative of one or more recent driving behaviors of the user during the one or more recent trips; and
recent quantitative data indicative of a recent driving time in the current epoch; and
the computer-implemented method further comprises:
generating a prior epoch score based at least in part upon the prior telematics data and based at least in part upon the prior qualitative data and the prior quantitative data;
generating a current epoch score, comprising:
generating a first current epoch score based at least in part upon the recent qualitative data and the recent quantitative data; and
generating a second current epoch score based at least in part upon the prior qualitative data, the prior quantitative data, the recent qualitative data, and the recent quantitative data.

7. The computer-implemented method of claim 1, wherein:
receiving recent telematics data comprises receiving the recent telematics data at least one of in real-time, in near real-time, after completion of each recent trip of the one or more recent trips, continuously, or at a pre-determined time; and
the computer-implemented method further comprises:
generating a current epoch score, comprising at least one of in real-time, in near real-time, after completion of each recent trip of the one or more recent trips, continuously, or at a pre-determined time.

8. The computer-implemented method of claim 1, further comprising:
receiving third-party information associated with at least one of the one or more prior trips or the one or more recent trips;
the computer-implemented method further comprises at least one of the:
generating a prior epoch score based at least in part upon the prior telematics data and the third-party information; or
generating a current epoch score based at least in part upon the recent telematics data and the third-party information.

9. The computer-implemented method of claim 1, further comprising:
determining a rate or discount for an associated product based at least in part upon a current epoch score; and
presenting the rate or discount to the user via a display.

10. The computer-implemented method of claim 1, further comprising:
determining a comparison result by at least comparing a current epoch score of the user to current epoch scores of one or more related users; and
presenting the comparison result to the user via a display.

11. The computer-implemented method of claim 1, further comprising:
    detecting, using one or more sensors associated with the mobile device, whether the vehicle is being operated by the user; and
    collecting, in response to detecting that the vehicle is being operated by the user, telematics data using the one or more sensors.

12. The computer-implemented method of claim 1, further comprising at least one of:
    generating, using a neural network, a prior epoch score based at least in part upon the prior telematics data; or
    generating, using a neural network, a current epoch score based at least in part upon the recent telematics data.

13. A system for generating a hybrid current epoch score for a user, the system comprising:
    one or more processors;
    one or more non-transitory computer-readable media storing computing instructions that, when executed on the one or more processors, cause the one or more processors to perform operations comprising:
        receive prior telematics data indicative of an operation of a vehicle by the user during one or more prior trips in a prior epoch representing a first period of time associated with a first time unit;
        receive, from a mobile device, recent telematics data indicative of the operation of the vehicle by the user during one or more recent trips in a current epoch representing a second period of time associated with a second time unit, the first time unit being same as the second time unit; and
        generating the hybrid current epoch score based at least in part upon (i) the prior telematics data and (ii) the recent telematics data.

14. The system of claim 13, wherein the operations further comprise:
    generating a current epoch score based at least in part upon the recent telematics data and a prior epoch score, wherein the current epoch score is a first current epoch score, and wherein generating the current epoch score further comprises:
        generating a second current epoch score by applying a trained machine learning model to the recent telematics data; and
        generating the first current epoch score using the second current epoch score and the prior epoch score.

15. The system of claim 13, wherein:
    the prior epoch is associated with a prior epoch time;
    the one or more recent trips are associated with a recent driving time and an elapsed time, the recent driving time being an amount of time the vehicle was under operation in the current epoch, the elapsed time being the amount of time that has passed in the current epoch; and
    the operations further comprise:
        generate a current epoch score by at least:
            determining a remaining time of the current epoch as the prior epoch time minus the elapsed time; and
            determining the current epoch score based at least in part upon a prior epoch score, the remaining time, and the recent driving time.

16. The system of claim 13, wherein:
    the current epoch is associated with a plurality of time segments;
    each recent trip of the one or more recent trips is associated with one or more time segments of the plurality of time segments; and
    the operations further comprise:
        generate a current epoch score by at least:
            assigning each segment of the plurality of time segments with a prior epoch score;
            generating, for each recent trip of the one or more recent trips, a trip current epoch score based at least in part upon the recent telematics data; and
            updating, for each recent trip of the one or more recent trips, the one or more time segments, as associated, with the trip current epoch score, as associated; and
            generating the current epoch score based at least in part upon the trip current epoch score for each segment of the plurality of time segments that was updated and the prior epoch score for each segment of the plurality of time segments that was not updated.

17. The system of claim 13, wherein the operations further comprise:
    receive historic telematics data indicative of the operation of the vehicle by the user during one or more historic trips in one or more historic epochs;
    receive the one or more recent trips associated with a recent driving time and an elapsed time, the recent driving time being an amount of time the vehicle was under operation in the current epoch, the elapsed time being the amount of time that has passed in the current epoch; and
    determine a historic epoch time based at least in part upon the historic telematics data, the historic epoch time being an average total time of a historic epoch of the one or more historic epochs;
    wherein:
        the one or more recent trips is associated with a recent driving time and an elapsed time, the recent driving time being an amount of time the vehicle was under operation in the current epoch, the elapsed time being the amount of time that has passed in the current epoch; and
    generate a current epoch score by at least:
        determining a remaining time of the current epoch as the historic epoch time minus the elapsed time; and
        determining the current epoch score based at least in part upon a ratio of the elapsed time to a time historically driven per epoch, a prior epoch score and a ratio of the remaining time to the time historically driven per epoch.

18. A non-transitory computer-readable medium with instructions stored thereon, that upon execution by a processor, causes the processor to perform operations comprising:
    receiving prior telematics data indicative of an operation of a vehicle by a user during one or more prior trips in a prior epoch representing a first period of time associated with a first time unit;
    receiving recent telematics data indicative of the operation of the vehicle by the user during one or more recent trips in a current epoch representing a second period of time associated with a second time unit, the first time unit being same as the second time unit; and
    generating a hybrid current epoch score based at least in part upon (i) the prior telematics data and (ii) the recent telematics data.

19. The non-transitory computer-readable medium of claim 18, wherein the operations further comprise:
    generating a current epoch score based at least in part upon the recent telematics data and a prior epoch score, wherein the current epoch score is a first current epoch score, and wherein generating the current epoch score further comprises:
generating a second current epoch score by applying a trained machine learning model to the recent telematics data; and
generating the first current epoch score using the second current epoch score and the prior epoch score.

20. The non-transitory computer-readable medium of claim 18, wherein:
the current epoch is associated with a plurality of time segments;
each recent trip of the one or more recent trips is associated with one or more time segments of the plurality of time segments;
each recent trip of the one or more recent trips is associated with one or more time segments of the plurality of time segments; and
wherein the operations further comprise:
generating a current epoch score comprising:
assigning each segment of the plurality of time segments with a prior epoch score;
generating, for each recent trip of the one or more recent trips, a trip current epoch score based at least in part upon the recent telematics data; and
updating, for each recent trip of the one or more recent trips, the one or more time segments, that are associated with each recent trip, with the trip current epoch score, that is associated with the each recent trip; and
generating the current epoch score based at least in part upon the trip current epoch score for each segment of the plurality of time segments that was updated and the prior epoch score for each segment of the plurality of time segments that was not updated.

21. A system for generating epoch scores for a user, the system comprising:
a means for storing instructions thereon; and
a means for performing operations comprising:
receiving prior telematics data indicative of an operation of a vehicle by the user during one or more prior trips in a prior epoch representing a first period of time associated with a first time unit;
receiving, from a mobile device, recent telematics data indicative of the operation of the vehicle by the user during one or more recent trips in a current epoch representing a second period of time associated with a second time unit, the first time unit being same as the second time unit; and
generating a hybrid current epoch score based at least in part upon (i) the prior telematics data and (ii) the recent telematics data.

* * * * *